US011669238B2

(12) United States Patent
Chaudhri et al.

(10) Patent No.: US 11,669,238 B2
(45) Date of Patent: **\*Jun. 6, 2023**

(54) UNLOCKING A DEVICE BY PERFORMING GESTURES ON AN UNLOCK IMAGE

(71) Applicant: Apple Inc., Cupertino, CA (US)

(72) Inventors: Imran Chaudhri, San Francisco, CA (US); Bas Ording, San Francisco, CA (US); Freddy Allen Anzures, San Francisco, CA (US); Marcel Van Os, San Francisco, CA (US); Scott Forstall, Los Altos, CA (US); Greg Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,825

(22) Filed: Jul. 13, 2021

(65) Prior Publication Data

US 2021/0342052 A1    Nov. 4, 2021

Related U.S. Application Data

(63) Continuation of application No. 16/934,710, filed on Jul. 21, 2020, now Pat. No. 11,086,507, which is a
(Continued)

(51) Int. Cl.
*G06F 3/0488*        (2022.01)
*G06F 3/04883*       (2022.01)
(Continued)

(52) U.S. Cl.
CPC ............ *G06F 3/0488* (2013.01); *G06F 3/017* (2013.01); *G06F 3/0484* (2013.01);
(Continued)

(58) Field of Classification Search
CPC ...... G06F 3/0488; G06F 3/017; G06F 4/0484; G06F 3/04842; G06F 3/04883;
(Continued)

(56) References Cited

U.S. PATENT DOCUMENTS 5,465,084 A    11/1995 Cottrell
5,559,961 A     9/1996 Blonder
(Continued)

FOREIGN PATENT DOCUMENTS

CN    1220433 A    6/1999
CN    1685357 A    10/2005
(Continued)

OTHER PUBLICATIONS

Office Action received for Indian Patent Application No. 202048029793, dated Feb. 22, 2022, 7 pages.
(Continued)

*Primary Examiner* — William D Titcomb
(74) *Attorney, Agent, or Firm* — DLA Piper LLP (US)

(57) ABSTRACT

A device with a touch-sensitive display may be unlocked via gestures performed on the touch-sensitive display. The device is unlocked if contact with the display corresponds to a predefined gesture for unlocking the device. The device displays one or more unlock images with respect to which the predefined gesture is to be performed in order to unlock the device. The performance of the predefined gesture with respect to the unlock image may include moving the unlock image to a predefined location and/or moving the unlock image along a predefined path. The device may also display visual cues of the predefined gesture on the touch screen to remind a user of the gesture.

39 Claims, 15 Drawing Sheets

Related U.S. Application Data continuation of application No. 16/132,213, filed on Sep. 14, 2018, now Pat. No. 10,754,538, which is a continuation of application No. 14/248,255, filed on Apr. 8, 2014, now Pat. No. 10,078,439, which is a continuation of application No. 13/791,799, filed on Mar. 8, 2013, now Pat. No. 8,745,544, and a continuation of application No. 13/791,808, filed on Mar. 8, 2013, now Pat. No. 8,694,923, said application No. 13/791,799 is a continuation of application No. 13/563,663, filed on Jul. 31, 2012, now Pat. No. 8,640,057, said application No. 13/791,808 is a continuation of application No. 13/563,663, filed on Jul. 31, 2012, now Pat. No. 8,640,057, which is a continuation of application No. 13/204,572, filed on Aug. 5, 2011, now Pat. No. 8,286,103, which is a continuation of application No. 12/477,075, filed on Jun. 2, 2009, now Pat. No. 8,046,721, which is a continuation of application No. 11/322,549, filed on Dec. 23, 2005, now Pat. No. 7,657,849.

(51) Int. Cl.
  *G06F 21/36* (2013.01)
  *H04M 1/663* (2006.01)
  *H04M 1/67* (2006.01)
  *G06F 3/01* (2006.01)
  *G06F 3/0484* (2022.01)
  *G06F 3/04842* (2022.01)
  *H04M 1/57* (2006.01)

(52) U.S. Cl.
  CPC ...... *G06F 3/04842* (2013.01); *G06F 3/04883* (2013.01); *G06F 21/36* (2013.01); *H04M 1/663* (2013.01); *H04M 1/67* (2013.01); *H04M 1/575* (2013.01); *H04M 2250/22* (2013.01)

(58) Field of Classification Search
  CPC ......... G06F 21/36; H04M 1/663; H04M 1/67; H04M 2250/22
  USPC ........................................................ 715/847
  See application file for complete search history.

(56) References Cited

U.S. PATENT DOCUMENTS

| | | | |
|---|---|---|---|
| 5,677,710 A | 10/1997 | Thompson-Rohrlich | |
| 5,821,933 A | 10/1998 | Keller et al. | |
| 5,907,327 A | 5/1999 | Ogura et al. | |
| 6,094,197 A * | 7/2000 | Buxton | G06F 3/0482 715/863 |
| 6,151,208 A | 11/2000 | Bartlett | |
| 6,160,555 A | 12/2000 | Kang et al. | |
| 6,192,478 B1 | 2/2001 | Elledge | |
| 6,249,606 B1 | 6/2001 | Kiraly et al. | |
| 6,323,846 B1 | 11/2001 | Westerman et al. | |
| 6,347,290 B1 | 2/2002 | Bartlett | |
| 6,421,453 B1 | 7/2002 | Kanevsky et al. | |
| 6,424,711 B1 | 7/2002 | Bayless et al. | |
| 6,442,251 B1 | 8/2002 | Maes et al. | |
| 6,570,557 B1 | 5/2003 | Westerman et al. | |
| 6,573,883 B1 | 6/2003 | Bartlett | |
| 6,633,310 B1 | 10/2003 | Andrew et al. | |
| 6,677,932 B1 | 1/2004 | Westerman | |
| 6,709,333 B1 | 3/2004 | Bradford et al. | |
| 6,720,860 B1 | 4/2004 | Narayanaswami | |
| 6,735,695 B1 | 5/2004 | Gopalakrishnan et al. | |
| 6,877,097 B2 | 4/2005 | Hamid et al. | |
| 6,960,734 B1 | 11/2005 | Park | |
| 7,124,433 B2 | 10/2006 | Little | |
| 7,151,843 B2 | 12/2006 | Rui et al. | |
| 7,174,462 B2 | 2/2007 | Pering et al. | |
| 7,190,816 B2 | 3/2007 | Mitsuyu et al. | |
| 7,236,576 B2 | 6/2007 | Schnarel et al. | |
| 7,263,670 B2 | 8/2007 | Rekimoto | |
| 7,286,063 B2 | 10/2007 | Gauthey et al. | |
| 7,289,063 B2 | 10/2007 | Zaghloul | |
| 7,395,506 B2 | 7/2008 | Tan et al. | |
| 7,420,546 B2 | 9/2008 | Abdallah et al. | |
| 7,480,870 B2 | 1/2009 | Anzures et al. | |
| 7,593,000 B1 | 9/2009 | Chin | |
| 7,626,598 B2 | 12/2009 | Manchester | |
| 7,627,904 B2 | 12/2009 | Tokkonen | |
| 7,657,849 B2 | 2/2010 | Chaudhri et al. | |
| 7,793,225 B2 | 9/2010 | Anzures et al. | |
| 7,810,105 B2 | 10/2010 | Prabandham et al. | |
| 8,006,299 B2 | 8/2011 | Suominen | |
| 8,046,721 B2 | 10/2011 | Chaudhri et al. | |
| 8,095,879 B2 | 1/2012 | Goertz | |
| 8,209,637 B2 | 6/2012 | Chaudhri et al. | |
| 8,286,103 B2 | 10/2012 | Chaudhri et al. | |
| 8,352,745 B2 | 1/2013 | Mckeeth | |
| 8,527,903 B2 | 9/2013 | Chaudhri et al. | |
| 8,528,072 B2 | 9/2013 | Shi et al. | |
| 8,627,237 B2 | 1/2014 | Chaudhri et al. | |
| 8,640,057 B2 | 1/2014 | Chaudhri et al. | |
| 8,694,923 B2 * | 4/2014 | Chaudhri | G06F 3/04842 345/15 |
| 8,745,544 B2 | 6/2014 | Forstall et al. | |
| 8,782,775 B2 | 7/2014 | Schell et al. | |
| 10,078,439 B2 | 9/2018 | Chaudhri et al. | |
| 10,281,999 B2 * | 5/2019 | Foss | G06F 3/0362 |
| 10,754,538 B2 * | 8/2020 | Chaudhri | G06F 3/0488 |
| 2001/0011308 A1 | 8/2001 | Clark et al. | |
| 2001/0012022 A1 | 8/2001 | Smith | |
| 2002/0008691 A1 | 1/2002 | Hanajima et al. | |
| 2002/0015024 A1 | 2/2002 | Westerman et al. | |
| 2002/0191029 A1 | 12/2002 | Gillespie et al. | |
| 2002/0196274 A1 | 12/2002 | Comfort et al. | |
| 2003/0115490 A1 | 6/2003 | Russo et al. | |
| 2003/0120934 A1 | 6/2003 | Ortiz | |
| 2003/0142138 A1 | 7/2003 | Brown et al. | |
| 2003/0163710 A1 | 8/2003 | Ortiz et al. | |
| 2003/0194114 A1 | 10/2003 | Mitsuyu et al. | |
| 2003/0206202 A1 | 11/2003 | Moriya | |
| 2003/0222913 A1 | 12/2003 | Mattila et al. | |
| 2004/0030934 A1 | 2/2004 | Mizoguchi et al. | |
| 2004/0034801 A1 | 2/2004 | Jaeger | |
| 2004/0042542 A1 | 3/2004 | Kawada et al. | |
| 2004/0085351 A1 | 5/2004 | Tokkonen | |
| 2004/0088564 A1 | 5/2004 | Norman | |
| 2004/0088568 A1 | 5/2004 | Tokkonen | |
| 2004/0113819 A1 | 6/2004 | Gauthey et al. | |
| 2004/0135801 A1 | 7/2004 | Thompson et al. | |
| 2004/0230843 A1 | 11/2004 | Jansen | |
| 2004/0250138 A1 | 12/2004 | Schneider | |
| 2004/0260955 A1 | 12/2004 | Mantyla | |
| 2004/0268267 A1 | 12/2004 | Moravcsik | |
| 2005/0034083 A1 | 2/2005 | Jaeger | |
| 2005/0050477 A1 | 3/2005 | Robertson et al. | |
| 2005/0058438 A1 | 3/2005 | Hayashi | |
| 2005/0060554 A1 | 3/2005 | O'donoghue | |
| 2005/0071635 A1 | 3/2005 | Furuyama | |
| 2005/0079896 A1 | 4/2005 | Kokko et al. | |
| 2005/0206501 A1 | 9/2005 | Farhat | |
| 2005/0212760 A1 | 9/2005 | Marvit et al. | |
| 2005/0216862 A1 | 9/2005 | Shinohara et al. | |
| 2005/0216867 A1 | 9/2005 | Marvit et al. | |
| 2005/0221798 A1 | 10/2005 | Sengupta et al. | |
| 2005/0248542 A1 | 11/2005 | Sawanobori | |
| 2005/0253817 A1 | 11/2005 | Rytivaara et al. | |
| 2005/0264833 A1 | 12/2005 | Hiraoka et al. | |
| 2005/0289476 A1 | 12/2005 | Tokkonen | |
| 2006/0031776 A1 | 2/2006 | Glein et al. | |
| 2006/0095369 A1 | 5/2006 | Hofi | |
| 2006/0136087 A1 | 6/2006 | Higashiura | |
| 2006/0136734 A1 | 6/2006 | Telek et al. | |
| 2006/0161870 A1 | 7/2006 | Hotelling et al. | |
| 2006/0174339 A1 | 8/2006 | Tao | |
| 2006/0267955 A1 | 11/2006 | Hino | |
| 2006/0289638 A1 | 12/2006 | Schilling | |

(56) References Cited

U.S. PATENT DOCUMENTS

| | | |
|---|---|---|
| 2007/0109274 A1 | 5/2007 | Reynolds |
| 2007/0110287 A1 | 5/2007 | Kim et al. |
| 2007/0150826 A1 | 6/2007 | Anzures et al. |
| 2007/0150842 A1 | 6/2007 | Chaudhri et al. |
| 2007/0220273 A1 | 9/2007 | Campisi |
| 2007/0236330 A1 | 10/2007 | Cho et al. |
| 2007/0236475 A1 | 10/2007 | Wherry |
| 2007/0273658 A1 | 11/2007 | Yli-Nokari et al. |
| 2007/0300140 A1 | 12/2007 | Makela et al. |
| 2008/0034292 A1 | 2/2008 | Brunner et al. |
| 2008/0034307 A1 | 2/2008 | Cisler et al. |
| 2008/0042979 A1 | 2/2008 | Nikbin |
| 2008/0042983 A1 | 2/2008 | Kim et al. |
| 2008/0055263 A1 | 3/2008 | Lemay et al. |
| 2008/0055269 A1 | 3/2008 | Lemay et al. |
| 2008/0069412 A1 | 3/2008 | Champagne et al. |
| 2008/0072172 A1 | 3/2008 | Shinohara et al. |
| 2008/0082934 A1 | 4/2008 | Kocienda et al. |
| 2008/0094371 A1 | 4/2008 | Forstall et al. |
| 2008/0122796 A1 | 5/2008 | Jobs et al. |
| 2008/0134170 A1 | 6/2008 | Astheimer |
| 2008/0168075 A1 | 7/2008 | Kamiyabu |
| 2008/0168290 A1 | 7/2008 | Jobs et al. |
| 2008/0178283 A1 | 7/2008 | Pratt et al. |
| 2009/0005165 A1 | 1/2009 | Arezina et al. |
| 2009/0006846 A1 | 1/2009 | Rosenblatt |
| 2009/0006991 A1 | 1/2009 | Lindberg et al. |
| 2009/0007017 A1 | 1/2009 | Anzures et al. |
| 2009/0043180 A1 | 2/2009 | Tschautscher et al. |
| 2009/0063352 A1 | 3/2009 | Kaufman |
| 2009/0064055 A1 | 3/2009 | Chaudhri et al. |
| 2009/0074255 A1 | 3/2009 | Holm |
| 2009/0128581 A1 | 5/2009 | Brid et al. |
| 2009/0153474 A1 | 6/2009 | Quennesson |
| 2009/0169070 A1 | 7/2009 | Fadell |
| 2009/0201257 A1 | 8/2009 | Saitoh et al. |
| 2009/0215497 A1 | 8/2009 | Louch |
| 2009/0241072 A1 | 9/2009 | Chaudhri et al. |
| 2009/0284482 A1 | 11/2009 | Chin |
| 2009/0328162 A1 | 12/2009 | Kokumai et al. |
| 2010/0053301 A1 | 3/2010 | Ryu et al. |
| 2010/0076823 A1 | 3/2010 | Feldman et al. |
| 2010/0079380 A1 | 4/2010 | Nurmi |
| 2010/0134248 A1 | 6/2010 | Adams et al. |
| 2010/0162180 A1 | 6/2010 | Dunnam et al. |
| 2010/0164684 A1 | 7/2010 | Sasa et al. |
| 2010/0225607 A1 | 9/2010 | Kim |
| 2010/0235732 A1 | 9/2010 | Bergman |
| 2010/0245553 A1 | 9/2010 | Schuler et al. |
| 2010/0306718 A1 | 12/2010 | Shim et al. |
| 2011/0010672 A1 | 1/2011 | Hope |
| 2011/0013813 A1 | 1/2011 | Yamamoto et al. |
| 2011/0170750 A1 | 7/2011 | Kropp et al. |
| 2011/0283241 A1 | 11/2011 | Miller et al. |
| 2011/0285648 A1 | 11/2011 | Simon |
| 2012/0009896 A1 | 1/2012 | Bandyopadhyay et al. |
| 2012/0021724 A1 | 1/2012 | Olsen et al. |
| 2012/0023458 A1 | 1/2012 | Chaudhri et al. |
| 2012/0047112 A1 | 2/2012 | Kim et al. |
| 2012/0182226 A1 | 7/2012 | Tuli |
| 2012/0188206 A1 | 7/2012 | Sparf et al. |
| 2012/0293438 A1 | 11/2012 | Chaudhri et al. |
| 2012/0311499 A1 | 12/2012 | Dellinger et al. |
| 2013/0347102 A1 | 12/2013 | Shi |
| 2015/0082252 A1 | 3/2015 | Forstall et al. |
| 2019/0026003 A1 | 1/2019 | Chaudhri et al. |
| 2020/0348816 A1 | 11/2020 | Chaudhri et al. |

FOREIGN PATENT DOCUMENTS

| | | |
|---|---|---|
| CN | 1836397 A | 9/2006 |
| CN | 100999961 A | 7/2007 |
| EP | 328084 A2 | 8/1989 |
| EP | 1284450 A2 | 2/2003 |
| EP | 1462920 A2 | 9/2004 |
| EP | 2060970 A1 | 5/2009 |
| EP | 1964022 B1 | 3/2010 |
| GB | 2313460 A | 11/1997 |
| JP | 60-171560 A | 9/1985 |
| JP | 2-249062 A | 10/1990 |
| JP | 4-158434 A | 6/1992 |
| JP | 5-127819 A | 5/1993 |
| JP | 6-214954 A | 8/1994 |
| JP | 7-84661 A | 3/1995 |
| JP | 7-84661 B2 | 9/1995 |
| JP | 8-263214 A | 10/1996 |
| JP | 8-263215 A | 10/1996 |
| JP | 9-18566 A | 1/1997 |
| JP | 9-128208 A | 5/1997 |
| JP | 9-221950 A | 8/1997 |
| JP | 10-69346 A | 3/1998 |
| JP | 11-203045 A | 7/1999 |
| JP | 2000-181436 A | 6/2000 |
| JP | 2000-322199 A | 11/2000 |
| JP | 2000-349886 A | 12/2000 |
| JP | 2003-67343 A | 3/2003 |
| JP | 2003-85540 A | 3/2003 |
| JP | 2003-91370 A | 3/2003 |
| JP | 2004-252720 A | 9/2004 |
| JP | 2004-532477 A | 10/2004 |
| JP | 2004-348599 A | 12/2004 |
| JP | 2004-348600 A | 12/2004 |
| JP | 2004-348601 A | 12/2004 |
| JP | 2005-4490 A | 1/2005 |
| JP | 2005-71008 A | 3/2005 |
| JP | 2005-167455 A | 6/2005 |
| JP | 2007-71008 A | 3/2007 |
| TW | M317045 U | 8/2007 |
| WO | 2000/31560 A2 | 6/2000 |
| WO | 2001/77792 A2 | 10/2001 |
| WO | 2002/33882 A1 | 4/2002 |
| WO | 2002/093542 A1 | 11/2002 |
| WO | 2003/038569 A2 | 5/2003 |
| WO | 2004/001560 A1 | 12/2003 |
| WO | 2004/021108 A2 | 3/2004 |
| WO | 2005/041020 A1 | 5/2005 |
| WO | 2006/071928 A2 | 7/2006 |

OTHER PUBLICATIONS

Office Action received for Australian Patent Application No. 2021201814, dated Mar. 4, 2022, 2 pages.
"Neonode N1m", Available Online at: <https://www.ixbt.com/mobile/review/neonoden1m.shtml>, Aug. 23, 2005, 10 pages. {See Communication under 37 CFR § 1.98(a) (3)}.
Office Action received for Korean Patent Application No. 10-2020-7035982, dated Oct. 22, 2021, 8 pages (4 pages of English Translation and 4 pages of Official Copy).
Notice of Hearing received for Indian Patent Application No. 5930/CHENP/2014, dated Nov. 16, 2021, 2 pages.
Notice of Acceptance received for Australian Patent Application No. 2021201814, dated Apr. 11, 2022, 3 pages.
Notice of Allowance received for Korean Patent Application No. 10-2020-7035982, dated Apr. 25, 2022, 4 pages (2 pages of English Translation and 2 pages of Official Copy).
Applicant-Initiated Interview Summary received for U.S. Appl. No. 16/934,710, dated Apr. 19, 2021, 2 pages.
Bardram Jakobe, "The Trouble with Login: on Usability and Computer Security in Ubiquitous Computing", Journal Personal and Ubiquitous Computing, vol. 9, Jul. 23, 2005, pp. 357-367.
Baudisch et al., "Phosphor: Explaining Transitions in the User Interface Using Afterglow Effects", Proceedings of the 19th Annual ACM Symposium on User Interface Software and Technology, Oct. 15-18, 2006, pp. 169-178.
Carr et al., "Using Interaction Object Graphs to Specify Graphical Widgets", Available Online at <http://www.cs.umd.edu/hcil/trs/94-09/94-09.pdf>, Sep. 1994, 32 pages.
Certificate of Grant received for Australian Patent Application No. 2011101192, dated Apr. 12, 2012, 1 page.
Certificate of Grant received for Australian Patent Application No. 2011101193, dated Apr. 23, 2012, 1 page.

(56) References Cited

OTHER PUBLICATIONS

Corrected Notice of Allowance received for U.S. Appl. No. 16/934,710, dated May 26, 2021, 5 pages.
Dailytech, "Analysis: Neonode Patented Swipe-to-Unlock 3 Years Before Apple", available at: <http://www.dailytech.com/Analysis+Neonode+Patented+SwipetoUnlock+3+Years+Before+Apple/article24046.htm>, Feb. 20, 2012, 4 pages.
Decision from Board of Appeal received for European Patent Application No. 10194359.5, dated Jun. 24, 2019, 22 pages.
Decision of Appeal received for Japanese Patent Application No. 2008-547675, dated Dec. 3, 2013, 29 pages.
Decision to Grant received for European Patent Application No. 09170574.9, dated Feb. 22, 2018, 2 pages.
Decision to Grant Received for European Patent Application No. 06846405.6, dated Feb. 11, 2010, 2 pages.
Decision to Grant received for Japanese Patent Application No. 2012-091352, dated May 17, 2013, 5 pages.
Decision to Grant received for Japanese Patent Application No. 2013-101691, dated Jun. 26, 2013, 4 pages.
Decision to Refuse received for European Patent Application No. 10194359.5, dated Jul. 19, 2017, 35 pages.
Decision to Refuse received for European Patent Application No. 18195407.4, dated Oct. 22, 2020, 8 pages.
Extended European Search Report and Search opinion received for European Patent Application No. 09170574.9, dated Oct. 13, 2009, 8 pages.
Extended European Search Report and Search Opinion received for European Patent Application No. 10194359.5, dated Feb. 7, 2011, 9 pages.
Extended European Search Report received for European Patent Application No. 18195407.4, dated Dec. 4, 2018, 12 pages.
Extended European Search Report received for European Patent Application No. 18195408.2, dated Apr. 12, 2019, 11 pages.
Final Office Action received for U.S. Appl. No. 11/322,549, dated Mar. 23, 2009, 39 pages.
Final Office Action received for U.S. Appl. No. 11/322,549, dated Sep. 26, 2008, 30 pages.
Final Office Action received for U.S. Appl. No. 12/207,370, dated Dec. 13, 2011, 15 pages.
Final Office Action received for U.S. Appl. No. 12/207,370, dated Feb. 15, 2013, 17 pages.
Final Office Action received for U.S. Appl. No. 12/477,075, dated Sep. 17, 2010, 9 pages.
Final Office Action received for U.S. Appl. No. 12/842,899, dated Nov. 23, 2012, 12 pages.
Final Office Action received for U.S. Appl. No. 14/015,512, dated Nov. 29, 2016, 14 pages.
Final Office Action received for U.S. Appl. No. 14/015,512, dated Sep. 28, 2015, 15 pages.
Fitzpatrick et al., "Method for Access Control via Gestural Verification", IBM Technical Disclosure Bulletin, vol. 36, No. 9B, Sep. 1993, pp. 487-488.
Gridlock 1.32, "Graphical Security System for your Palm", available at: <http://gridlock.en.softonic.com/palm>, Oct. 8, 2003, 2 pages.
Horry et al., "A Passive-Style Buttonless Mobile Terminal", IEEE Transactions on Consumer Electronics; vol. 49; No. 3, Aug. 2003, pp. 530-535.
*HTC Europe Co. Ltd.* vs *Apple Inc.*, Nullity Reply Brief filed on Nov. 8, 2012, Nov. 8, 2012, 17 pages.
IBM, "Touch Pad Authentication", Sep. 21, 2004, 2 pages.
Intention to Grant received for European Patent Application No. 06846405.6, dated Aug. 28, 2009, 4 pages.
Intention to Grant received for European Patent Application No. 09170574.9, dated Jun. 20, 2017, 7 pages.
Intention to Grant received for European Patent Application No. 09170574.9, dated Oct. 5, 2017, 9 pages.
International Preliminary Report on Patentability received for PCT Patent Application No. PCT/US2006/061370, dated Jun. 24, 2008, 7 pages.

International Preliminary Report on Patentability received for PCT Patent Application No. PCT/US2006/061380, dated Jun. 24, 2008, 6 pages.
International Search Report and Written Opinion received for PCT Patent Application No. PCT/US2006/061370, dated May 25, 2007, 9 pages.
International Search Report and Written Opinion received for PCT Patent Application No. PCT/US2006/061380, dated Apr. 23, 2007, 7 pages.
Jansen Waynea, "Authenticating Users on Handheld Devices", Contribution ofthe National Institute of Standards and Technology, 2003, 13 pages.
Jermyn et al., "The Design and Analysis of Graphical Password", Proceedings ofthe 8th USENIX Security Symposium, Aug. 23-26, 1999, 15 pages.
Jgui Professional, "Touch Password Protection", available at <http://www.jgui.net/touch/index.html>, retrieved on Dec. 30, 2005, 4 pages.
Kotov Anton, "Review GSM phone Neonode N1m", available at <http://web.archive.org/web/20050730004341/http://www.mobile-review.com/review/neonode-n1m-en.shtml>, Jul. 30, 2005, 18 pages.
Mclean et al., "Access/Control Icons (Icon Keys)", IBM Technical Disclosure Bulletin, vol. 38, No. 4, Apr. 1995, pp. 407-409.
Minutes ofthe Oral Proceedings received for European Patent Application No. 10194359.5, dated Jun. 4, 2019, 3 pages.
Minutes of the Oral Proceedings received for European Patent Application No. 18195407.4, dated Oct. 8, 2020, 5 pages.
Monrose Newmanf, "Towards Stronger User Authentication", A Dissertation Submitted in Partial Fulfilment of the Requirements for the Degree of Doctor of Philosophy Department of Computer Science, New York University, May 1999, 130 pages.
"N1 Quick Start Guide", Version 0.5, Available at <http://www.instructionsmanuals.com/download/telefonos_movil/Neonode-N1-en.pdf>, Jul. 29, 2004, pp. 1-24.
Najjar Lawrence J., "Graphical Passwords", International Technology Disclosures, vol. 10, No. 1, Jan. 25, 1992, 1 page.
Neonode Inc., "Welcome to the N1 Guide", available at <http://www.ebookspdf.com/gadget/2818/neonode-n1m-manual/>, Jul. 2004, pp. 1-42.
"Neonode N1m", Available online at: <https://www.mobilmania.cz/clanky/neonode-n1m-svedsky-smartphonetest/fotogalerie-i-nepublikovane-snimky/sc-3-a-1110516-ch-1029652/default.aspx#articleStart2005.07.20>, Jul. 20, 2005, 6 pages.
"Neonode N1m", Available online at: http://www.gsmarena.com/neonode_n1m-pictures-1137.php, May 18, 2005, 4 pages.
Ni et al., "DiffUser: Differentiated User Access Control on Smart-phones", IEEE 6th International Conference on Mobile Adhoc and Sensor Systems, 2009, pp. 1012-1017.
Non-Final Office Action received for U.S. Appl. No. 11/322,549, dated Feb. 7, 2008, 28 pages.
Non-Final Office Action received for U.S. Appl. No. 11/322,550, dated Apr. 21, 2008, 22 pages.
Non-Final Office Action received for U.S. Appl. No. 11/322,550, dated Oct. 31, 2007, 23 pages.
Non-Final Office Action received for U.S. Appl. No. 12/207,370, dated Aug. 2, 2012, 16 pages.
Non-Final Office Action received for U.S. Appl. No. 12/207,370, dated May 6, 2011, 15 pages.
Non-Final Office Action received for U.S. Appl. No. 12/207,370, dated Oct. 17, 2013, 17 pages.
Non-Final Office Action received for U.S. Appl. No. 12/345,584, dated Jul. 24, 2009, 6 pages.
Non-Final Office Action received for U.S. Appl. No. 12/345,584, dated Nov. 16, 2009, 17 pages.
Non-Final Office Action received for U.S. Appl. No. 12/477,075, dated Feb. 7, 2011, 10 pages.
Non-Final Office Action received for U.S. Appl. No. 12/477,075, dated Jan. 29, 2010, 13 pages.
Non-Final Office Action received for U.S. Appl. No. 12/842,899, dated May 29, 2012, 16 pages.
Non-Final Office Action received for U.S. Appl. No. 13/204,572, dated Jan. 6, 2012, 10 pages.

(56) References Cited

OTHER PUBLICATIONS

Non-Final Office Action received for U.S. Appl. No. 13/250,659, dated Nov. 25, 2011, 11 pages.
Non-Final Office Action received for U.S. Appl. No. 13/563,663, dated Nov. 19, 2012, 10 pages.
Non-Final Office Action received for U.S. Appl. No. 13/791,808, dated Sep. 11, 2013, 13 pages.
Non-Final Office Action received for U.S. Appl. No. 14/015,512, dated Apr. 22, 2015, 13 pages.
Non-Final Office Action received for U.S. Appl. No. 14/015,512, dated May 20, 2016, 13 pages.
Non-Final Office Action received for U.S. Appl. No. 14/248,255, dated Aug. 10, 2017, 32 pages.
Non-Final Office Action received for U.S. Appl. No. 16/132,213, dated Feb. 21, 2020, 13 pages.
Non-Final Office Action received for U.S. Appl. No. 16/934,710, dated Jan. 6, 2021, 25 pages.
Notice of Acceptance received for Australian Patent Application No. 2006330724, dated Nov. 18, 2009, 1 page.
Notice of Acceptance received for Australian Patent Application No. 2010200661, dated Aug. 2, 2012, 3 pages.
Notice of Acceptance received for Australian Patent Application No. 2012254900, dated Jul. 30, 2015, 2 pages.
Notice of Acceptance received for Australian Patent Application No. 2015255304, dated Jan. 27, 2017, 3 pages.
Notice of Acceptance received for Australian Patent Application No. 2017203078, dated Jul. 31, 2018, 3 pages.
Notice of Acceptance received for Australian Patent Application No. 2018260823, dated Oct. 21, 2019, 3 pages.
Notice of Acceptance received for Australian Patent Application No. 2019283970, dated Dec. 15, 2020, 3 pages.
Notice of Allowance received for Chinese Patent Application No. 200910175855.7, dated Dec. 6, 2017, 2 pages.
Notice of Allowance received for Japanese Patent Application No. 2012-091352, dated May 24, 2013, 3 pages.
Notice of Allowance received for Japanese Patent Application No. 2013-007818, dated May 31, 2013, 4 pages.
Notice of Allowance received for Japanese Patent Application No. 2013-101691, dated Jul. 5, 2013, 4 pages.
Notice of Allowance received for Korean Patent Application No. 10-2009-7011994, dated Nov. 27, 2015, 4 pages.
Notice of Allowance received for Korean Patent Application No. 10-2014-7028441, dated Dec. 23, 2015, 4 pages.
Notice of allowance received for Korean Patent Application No. 10-2014-7033017, dated Dec. 23, 2015, 4 pages.
Notice of Allowance received for Korean Patent Application No. 10-2017-7018196 dated Sep. 29, 2017, 3 pages.
Notice of Allowance received for Korean Patent Application No. 10-2018-7000899, dated Dec. 26, 2018, 4 pages.
Notice of Allowance received for Korean Patent Application No. 10-2019-7008096, dated Feb. 25, 2020, 5 pages.
Notice of Allowance received for Korean Patent Application No. 10-2020-7014870, dated Sep. 11, 2020, 4 pages.
Notice of Allowance received for Korean Patent Application No. 10-2016-7005576, dated Mar. 29, 2017, 5 pages.
Notice of Allowance received for U.S. Appl. No. 11/322,549, dated Aug. 10, 2009, 9 pages.
Notice of Allowance received for U.S. Appl. No. 11/322,550, dated Sep. 19, 2008, 12 pages.
Notice of Allowance received for U.S. Appl. No. 12/207,370, dated Jun. 7, 2013, 9 pages.
Notice of Allowance received for U.S. Appl. No. 12/207,370, dated Mar. 6, 2014, 5 pages.
Notice of Allowance received for U.S. Appl. No. 12/345,584, dated Jun. 3, 2010, 6 pages.
Notice of Allowance received for U.S. Appl. No. 12/477,075, dated Aug. 10, 2011, 9 pages.
Notice of Allowance received for U.S. Appl. No. 12/842,899, dated May 2, 2013, 6 pages.
Notice of Allowance received for U.S. Appl. No. 13/204,572, dated Jun. 12, 2012, 8 pages.
Notice of Allowance received for U.S. Appl. No. 13/250,659, dated May 11, 2012, 9 pages.
Notice of Allowance received for U.S. Appl. No. 13/563,663, dated Aug. 15, 2013, 11 pages.
Notice of Allowance received for U.S. Appl. No. 13/563,663, dated Dec. 13, 2013, 11 pages.
Notice of Allowance received for U.S. Appl. No. 13/744,343, dated Feb. 17, 2016, 7 pages.
Notice of Allowance received for U.S. Appl. No. 13/787,712, dated Jun. 25, 2013, 10 pages.
Notice of Allowance received for U.S. Appl. No. 13/787,716, dated Sep. 5, 2013, 10 pages.
Notice of Allowance received for U.S. Appl. No. 13/791,799, dated Apr. 1, 2014, 9 pages.
Notice of Allowance received for U.S. Appl. No. 13/791,799, dated Jan. 21, 2014, 9 pages.
Notice of Allowance received for U.S. Appl. No. 13/791,799, dated Jun. 17, 2013, 10 pages.
Notice of Allowance received for U.S. Appl. No. 13/791,799, dated Oct. 30, 2013, 11 pages.
Notice of Allowance received for U.S. Appl. No. 13/791,808, dated Feb. 3, 2014, 9 pages.
Notice of Allowance received for U.S. Appl. No. 14/015,512, dated Apr. 5, 2017, 7 pages.
Notice of Allowance received for U.S. Appl. No. 14/015,512, dated Jul. 18, 2017, 2 pages.
Notice of Allowance received for U.S. Appl. No. 14/015,512, dated Jul. 28, 2017, 3 pages.
Notice of Allowance received for U.S. Appl. No. 14/248,255, dated Jun. 7, 2018, 5 pages.
Notice of Allowance received for U.S. Appl. No. 16/132,213, dated May 5, 2020, 5 pages.
Notice of Allowance received for U.S. Appl. No. 16/934,710, dated May 14, 2021, 7 pages.
Office Action received for Australian Patent Application No. 2006330724, dated Aug. 17, 2009, 2 pages.
Office Action received for Australian Patent Application No. 2010200661, dated Jul. 20, 2011, 2 pages.
Office Action received for Australian Patent Application No. 2011101192, dated Oct. 26, 2011, 2 pages.
Office Action received for Australian Patent Application No. 2011101193, dated Oct. 26, 2011, 2 pages.
Office Action received for Australian Patent Application No. 2012200716, dated Oct. 16, 2012, 4 pages.
Office Action received for Australian Patent Application No. 2012254900, dated May 29, 2015, 4 pages.
Office Action received for Australian Patent Application No. 2012254900, dated Nov. 28, 2013, 3 pages.
Office Action received for Australian Patent Application No. 2015255304, dated Dec. 2, 2016, 2 pages.
Office Action received for Australian Patent Application No. 2017203078, dated Apr. 26, 2018, 2 pages.
Office Action received for Australian Patent Application No. 2018260823, dated Jan. 24, 2019, 2 pages.
Office Action received for Australian Patent Application No. 2019283970, dated Sep. 30, 2020, 4 pages.
Office Action received for Chinese Patent Application No. 200680052770.4, dated Feb. 5, 2010, 4 pages.
Office Action received for Chinese Patent Application No. 200880108306.1, dated Aug. 9, 2012, 13 pages.
Office Action received for Chinese Patent Application No. 200880108306.1, dated Jan. 15, 2013, 14 pages.
Office Action received for Chinese Patent Application No. 200910175855.7, dated Apr. 10, 2017, 12 pages.
Office Action received for Chinese Patent Application No. 200910175855.7, dated Apr. 9, 2013, 9 pages.
Office Action received for Chinese Patent Application No. 200910175855.7, dated Aug. 5, 2015, 18 pages.
Office Action received for Chinese Patent Application No. 200910175855.7, dated Jul. 4, 2012, 15 pages.

(56) References Cited

OTHER PUBLICATIONS

Office Action received for Chinese Patent Application No. 200910175855.7, dated Jul. 26, 2011, 13 pages.
Office Action received for Chinese Patent Application No. 200910175855.7, dated Sep. 26, 2016, 6 pages.
Office Action received for European Patent Application No. 06846405.6, dated Mar. 25, 2009, 6 pages.
Office Action received for European Patent Application No. 09170574.9, dated Aug. 18, 2015, 6 pages.
Office Action received for European Patent Application No. 09170574.9, dated May 3, 2016, 6 pages.
Office Action Received for European Patent Application No. 09170574.9, dated May 26, 2010, 1 page.
Office Action received for European Patent Application No. 10194359.5, dated Aug. 18, 2015, 6 pages.
Office Action received for European Patent Application No. 18195407.4, dated Sep. 26, 2019, 7 pages.
Office Action received for European Patent Application No. 18195408.2, dated Dec. 21, 2020, 7 pages.
Office Action received for European Patent Application No. 18195408.2, dated Jan. 3, 2019, 3 pages.
Office Action received for German Patent Application No. 112006003515.0, dated Dec. 7, 2009, 4 pages.
Office Action received for German Patent Application No. 112006003515.0, dated Feb. 4, 2009, 6 pages.
Office Action received for Indian Patent Application No. 201848033396, dated Feb. 26, 2021, 5 pages.
Office Action received for Indian Patent Application No. 3347/CHENP/2008, dated Aug. 5, 2013, 2 pages.
Office Action received for Indian Patent Application No. 5930/CHENP/2014, dated Mar. 11, 2020, 7 pages.
Office Action received for Indian Patent Application No. 5931/CHENP/2014, dated Jan. 13, 2020, 8 pages.
Office Action received for Indian Patent Application No. 5932/CHENP/2014, dated Oct. 23, 2019, 7 pages.
Office Action received for Japanese Patent Application No. 2008-547675, dated Mar. 22, 2011, 5 pages.
Office Action received for Japanese Patent Application No. 2008-547675, dated Nov. 4, 2011, 6 pages.
Office Action received for Japanese Patent Application No. 2008-547675, dated Sep. 18, 2012, 4 pages.
Office Action received for Japanese Patent Application No. 2010-525891, dated Jan. 8, 2013, 4 pages.
Office Action received for Japanese Patent Application No. 2012-091352, dated Feb. 25, 2013, 33 pages.
Office Action received for Japanese Patent Application No. 2013-007818 dated Mar. 11, 2013, 5 pages.
Office Action received for Japanese Patent Application No. 2013-007818, dated Mar. 11, 2013, 10 pages.
Office Action received for Korean Patent Application No. 10-2009-7011994, dated Aug. 8, 2013, 1 page.
Office Action received for Korean Patent Application No. 10-2009-7011994, dated Feb. 25, 2015, 8 pages.
Office Action received for Korean Patent Application No. 10-2014-7028441, dated Feb. 3, 2015, 7 pages.
Office Action received for Korean Patent Application No. 10-2014-7033017, dated Jun. 24, 2015, 8 pages.
Office Action received for Korean Patent Application No. 10-2016-7005576, dated May 20, 2016, 9 pages.
Office Action received for Korean Patent Application No. 10-2018-7000899, dated Apr. 9, 2018, 7 pages.
Office Action received for Korean Patent Application No. 10-2019-7008096, dated Aug. 20, 2019, 5 pages.
Office Action received for Korean Patent Application No. 10-2020-7035982, dated Apr. 12, 2021, 5 pages.
Office Action received for Korean Patent Application No. 10-2008-7018109, dated Mar. 5, 2010, 5 pages.
Office Action received for Taiwanese Patent Application No. 097134592, dated Apr. 12, 2013, 8 pages.
Plaisant et al., "Touchscreen Toggle Design", CHI'92, May 3-7, 1992, pp. 667-668.
Plaisant et al., "Touchscreen Toggle Switches: Push or Slide? Design Issues and Usability Study", available online at: http://hcil2.cs.umd.edu/trs/90-08/90-08.pdf, Nov. 1990, 11 pages.
Plaisant et al., "Touchscreen Toggle Switches: Push or slide? Design Issues and Usability Study", Technical Report CAR-TR-521, CS-TR-2557, Nov. 1990, pp. 1-10.
Renaud et al., "My Password is Here! An Investigation into Visuo-Spatial Authentication Mechanisms", Interacting with Computers, vol. 16, 2004, pp. 1017-1041.
*Samsung Electronics GmbH* vs. *Apple Inc.*, Supplement to the Cancellation Request against utility model DE 212006000081 U1, dated Mar. 1, 2013, Exhibits D26-D32, Mar. 1, 2013, 211 pages.
*Samsung Electronics GmbH* vs. *Apple, Inc.*, Nullity action against European Patent EP 1964022 B1 granted with effect in the Federal Republic of Germany, dated Nov. 19, 2012, Exhibits D12-D21 and D25, Nov. 19, 2012, 269 pages.
Samsung Response to the Court's Notification in the Matter of *Samsung Electronics GmbH* vs *Apple, Inc.*, filed on Feb. 21, 2013, Feb. 21, 2013, 6 pages.
Second Corrected Notice of Allowance received for U.S. Appl. No. 16/934,710, dated Jun. 24, 2021, 2 pages.
Statement on the Preliminary Opinion in the Matter of *Motorola Mobility Germany GmbH* vs *Apple Inc.*, Exhibits NK11-NK18, Feb. 21, 2013, 156 pages.
Summons to attend Oral proceedings received for European Patent Application No. 09170574.9, dated Dec. 23, 2016, 10 pages.
Summons to attend Oral proceedings received for European Patent Application No. 10194359.5, dated Feb. 2, 2017, 8 pages.
Summons to attend Oral proceedings received for European Patent Application No. 10194359.5, dated Oct. 12, 2018, 14 pages.
Summons to Attend Oral Proceedings received for European Patent Application No. 18195407.4, dated Jul. 21, 2020, 5 pages.
Summons to Attend Oral Proceedings received for European Patent Application No. 18195407.4, dated Mar. 18, 2020, 12 pages.
Supplemental Notice of Allowance received for U.S. Appl. No. 12/207,370, dated Aug. 8, 2013, 2 pages.
Supplemental to the Summons for Oral Proceedings received for German Patent Application No. 112006003515.0, dated Jun. 3, 2017, 15 pages.
Translation of German Nullity Action Complaint against European Patent Application No. 1964022 (DE No. 602006012876.2), filed on Dec. 15, 2010, 37 pages.
Wiedenbeck et al., "PassPoints: Design and Longitudinal Evaluation of a Graphical Password System", International Journal of Human-Computer Studies, vol. 63, 2005, pp. 102-127.
Office Action received for European Patent Application No. 18195408.2, dated Jan. 31, 2022, 5 pages.
Summons to Attend Oral Proceedings received for European Patent Application No. 18195408.2, dated Feb. 6, 2023, 7 pages.
Notice of Hearing received for Indian Patent Application No. 5932/CHENP/2014, dated Feb. 13, 2023, 3 pages.

* cited by examiner

UNLOCKING A DEVICE BY PERFORMING GESTURES ON AN UNLOCK IMAGE

RELATED APPLICATIONS

This application is a continuation of U.S. application Ser. No. 16/934,710, filed Jul. 21, 2020, which is a continuation of U.S. application Ser. No. 16/132,213, filed Sep. 14, 2018, now U.S. Pat. No. 10,754,538, which is a continuation of U.S. application Ser. No. 14/248,255, filed Apr. 8, 2014, now U.S. Pat. No. 10,078,439, which is a continuation of U.S. application Ser. No. 13/791,808, filed Mar. 8, 2013, now U.S. Pat. No. 8,694,923 and U.S. application Ser. No. 13/791,799, filed Mar. 8, 2013, now U.S. Pat. No. 8,745,544, both of which are continuations of U.S. application Ser. No. 13/563,663, filed Jul. 31, 2012, now U.S. Pat. No. 8,640,057, which is a continuation of U.S. patent application Ser. No. 13/204,572 filed Aug. 5, 2011, now U.S. Pat. No. 8,286,103, which is a continuation of U.S. patent application Ser. No. 12/477,075, filed Jun. 2, 2009, now U.S. Pat. No. 8,046,721, which is a continuation of U.S. patent application Ser. No. 11/322,549, filed Dec. 23, 2005, now U.S. Pat. No. 7,657,849, which applications are incorporated by reference herein in their entirety.

This application is related to U.S. patent application Ser. No. 11/322,550, titled "Indication of Progress Towards Satisfaction of a User Input Condition," filed Dec. 23, 2005, which application is incorporated by reference herein in its entirety.

TECHNICAL FIELD

The disclosed embodiments relate generally to user interfaces that employ touch-sensitive displays, and more particularly, to the unlocking of user interfaces on portable electronic devices.

BACKGROUND

Touch-sensitive displays (also known as "touch screens" or "touchscreens") are well known in the art. Touch screens are used in many electronic devices to display graphics and text, and to provide a user interface through which a user may interact with the devices. A touch screen detects and responds to contact on the touch screen. A device may display one or more soft keys, menus, and other user-interface objects on the touch screen. A user may interact with the device by contacting the touch screen at locations corresponding to the user-interface objects with which she wishes to interact.

Touch screens are becoming more popular for use as displays and as user input devices on portable devices, such as mobile telephones and personal digital assistants (PDAs). One problem associated with using touch screens on portable devices is the unintentional activation or deactivation of functions due to unintentional contact with the touch screen. Thus, portable devices, touch screens on such devices, and/or applications running on such devices may be locked upon satisfaction of predefined lock conditions, such as upon entering an active call, after a predetermined time of idleness has elapsed, or upon manual locking by a user.

Devices with touch screens and/or applications running on such devices may be unlocked by any of several well-known unlocking procedures, such as pressing a predefined set of buttons (simultaneously or sequentially) or entering a code or password. These unlock procedures, however, have drawbacks. The button combinations may be hard to perform. Creating, memorizing, and recalling passwords, codes, and the like can be quite burdensome. These drawbacks may reduce the ease of use of the unlocking process and, as a consequence, the ease of use of the device in general.

Accordingly, there is a need for more efficient, user-friendly procedures for unlocking such devices, touch screens, and/or applications. More generally, there is a need for more efficient, user-friendly procedures for transitioning such devices, touch screens, and/or applications between user interface states (e.g., from a user interface state for a first application to a user interface state for a second application, between user interface states in the same application, or between locked and unlocked states). In addition, there is a need for sensory feedback to the user regarding progress towards satisfaction of a user input condition that is required for the transition to occur.

SUMMARY

In some embodiments, a method of controlling an electronic device with a touch-sensitive display includes: detecting contact with the touch-sensitive display while the device is in a user-interface lock state; moving an image corresponding to a user-interface unlock state of the device in accordance with the contact; transitioning the device to the user-interface unlock state if the detected contact corresponds to a predefined gesture; and maintaining the device in the user-interface lock state if the detected contact does not correspond to the predefined gesture.

In some embodiments, a method of controlling a device with a touch-sensitive display includes: displaying an image on the touch-sensitive display while the device is in a user-interface lock state; detecting contact with the touch-sensitive display; transitioning the device to a user-interface unlock state if the detected contact corresponds to moving the image to a predefined location on the touch-sensitive display; and maintaining the device in the user-interface lock state if the detected contact does not correspond to moving the image to the predefined location.

In some embodiments, a method of controlling a device with a touch-sensitive display includes: displaying an image on the touch-sensitive display while the device is in a user-interface lock state; detecting contact with the touch-sensitive display; and transitioning the device to a user-interface unlock state if the detected contact corresponds to moving the image on the touch-sensitive display according to a predefined path on the touch-sensitive display; and maintaining the device in the user-interface lock state if the detected contact does not correspond to moving the image according to the predefined path.

In some embodiments, a method of controlling a device with a touch-sensitive display includes: displaying first and second images on the touch-sensitive display while the device is in a user-interface lock state; detecting contact with the touch-sensitive display; transitioning the device to a first active state corresponding to the first image if the detected contact corresponds to a predefined gesture with respect to the first image; and transitioning the device to a second active state distinct from the first active state if the detected contact corresponds to a predefined gesture with respect to the second image.

The aforementioned methods may be performed by a portable electronic device having a touch-sensitive display with a graphical user interface (GUI), one or more processors, memory and one or more modules, programs or sets of instructions stored in the memory for performing these methods. In some embodiments, the portable electronic device provides a plurality of functions, including wireless communication.

Instructions for performing the aforementioned methods may be included in a computer program product configured for execution by one or more processors. In some embodiments, the executable computer program product includes a computer readable storage medium (e.g., one or more magnetic disk storage devices, flash memory devices, or other non-volatile solid state memory devices) and an executable computer program mechanism embedded therein.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
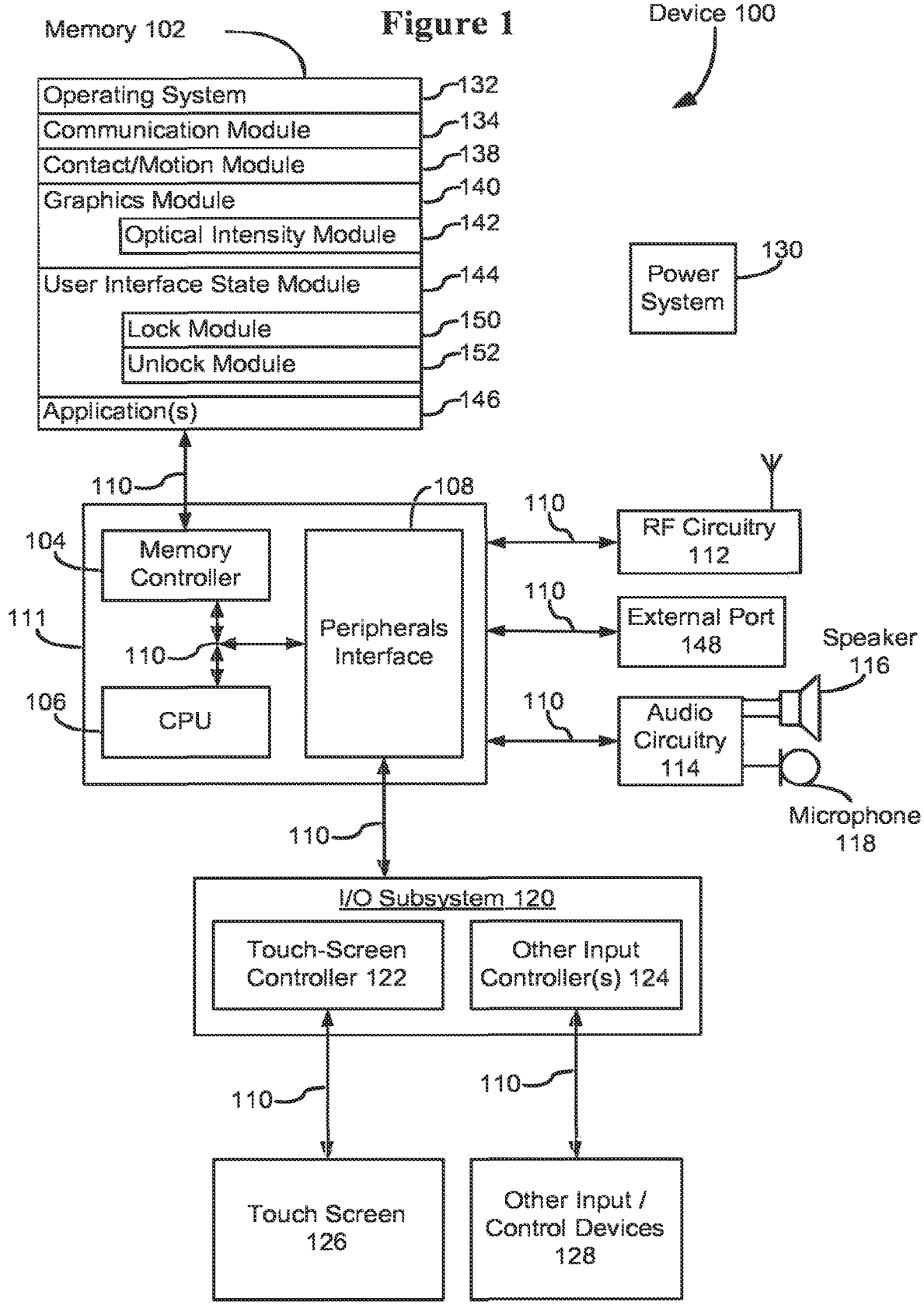
FIG. 1 is a block diagram illustrating a portable electronic device, according to some embodiments of the invention.

FIG. 1 illustrates a portable electronic device, according to some embodiments of the invention. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, a mobile phone, a media player, a personal digital assistant (PDA), or the like, including a combination of two or more of these items. It should be appreciated that the device 100 is only one example of a portable electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 118 from sound waves. The audio circuitry 114 converts the electrical signal to audio data and transmits the audio data to the peripherals interface 108 for processing. Audio data may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects, further details of which are described below.

The touch screen 126 also accepts input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The touch-sensitive display may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch screen 126 may have a resolution in excess of 100 dpi. In an exemplary embodiment, the touch screen 126 may have a resolution of approximately 168 dpi. The user may make contact with the touch screen 126 using any suitable object or appendage, such as a stylus, finger, and so forth.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140, a user interface state module (or set of instructions) 144, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 122, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 126 and the touch screen controller 122 also detects contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

The user interface state module 144 controls the user interface state of the device 100. The user interface state module 144 may include a lock module 150 and an unlock module 152. The lock module detects satisfaction of any of one or more conditions to transition the device 100 to a user-interface lock state and to transition the device 100 to the lock state. The unlock module detects satisfaction of any of one or more conditions to transition the device to a user-interface unlock state and to transition the device 100 to the unlock state. Further details regarding the user interface states are described below.

The one or more applications 130 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 may include the functionality of an MP3 player, such as an iPod (trademark of Apple Computer, Inc.). The device 100 may, therefore, include a 36-pin connector that is compatible with the iPod. In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In one embodiment, the device 100 includes the touch screen 126, the touchpad, a push button for powering the device on/off and locking the device, a volume adjustment rocker button and a slider switch for toggling ringer profiles. The push button may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

User Interface States

The device 100 may have a plurality of user interface states. A user interface state is a state in which the device 100 responds in a predefined manner to user input. In some embodiments, the plurality of user interface states includes a user-interface lock state and a user-interface unlock state. In some embodiments, the plurality of user interface states includes states for a plurality of applications.

In the user-interface lock state (hereinafter the "lock state"), the device 100 is powered on and operational but ignores most, if not all, user input. That is, the device 100 takes no action in response to user input and/or the device 100 is prevented from performing a predefined set of operations in response to the user input. The predefined set of operations may include navigation between user interfaces and activation or deactivation of a predefined set of functions. The lock state may be used to prevent unintentional or unauthorized use of the device 100 or activation or deactivation of functions on the device 100. When the device 100 is in the lock state, the device 100 may be said to be locked. In some embodiments, the device 100 in the lock state may respond to a limited set of user inputs, including input that corresponds to an attempt to transition the device 100 to the user-interface unlock state or input that corresponds to powering the device 100 off. In other words, the locked device 100 responds to user input corresponding to attempts to transition the device 100 to the user-interface unlock state or powering the device 100 off, but does not respond to user input corresponding to attempts to navigate between user interfaces. It should be appreciated that even if the device 100 ignores a user input, the device 100 may still provide sensory feedback (such as visual, audio, or vibration feedback) to the user upon detection of the input to indicate that the input will be ignored.

In embodiments where the device 100 includes the touch screen 126, while the device 100 is locked, a predefined set of operations, such as navigation between user interfaces, is prevented from being performed in response to contact on the touch screen 126 when the device 100 is locked. In other words, when the contact is being ignored by the locked device 100, the touch screen may be said to be locked. A locked device 100, however, may still respond to a limited class of contact on the touch screen 126. The limited class includes contact that is determined by the device 100 to correspond to an attempt to transition the device 100 to the user-interface unlock state.

In the user-interface unlock state (hereinafter the "unlock state"), the device 100 is in its normal operating state, detecting and responding to user input corresponding to interaction with the user interface. A device 100 that is in the unlock state may be described as an unlocked device 100. An unlocked device 100 detects and responds to user input for navigating between user interfaces, entry of data and activation or deactivation of functions. In embodiments where the device 100 includes the touch screen 126, the unlocked device 100 detects and responds to contact corresponding to navigation between user interfaces, entry of data and activation or deactivation of functions through the touch screen 126.

Unlocking a Device Via Gestures

Figure 2:
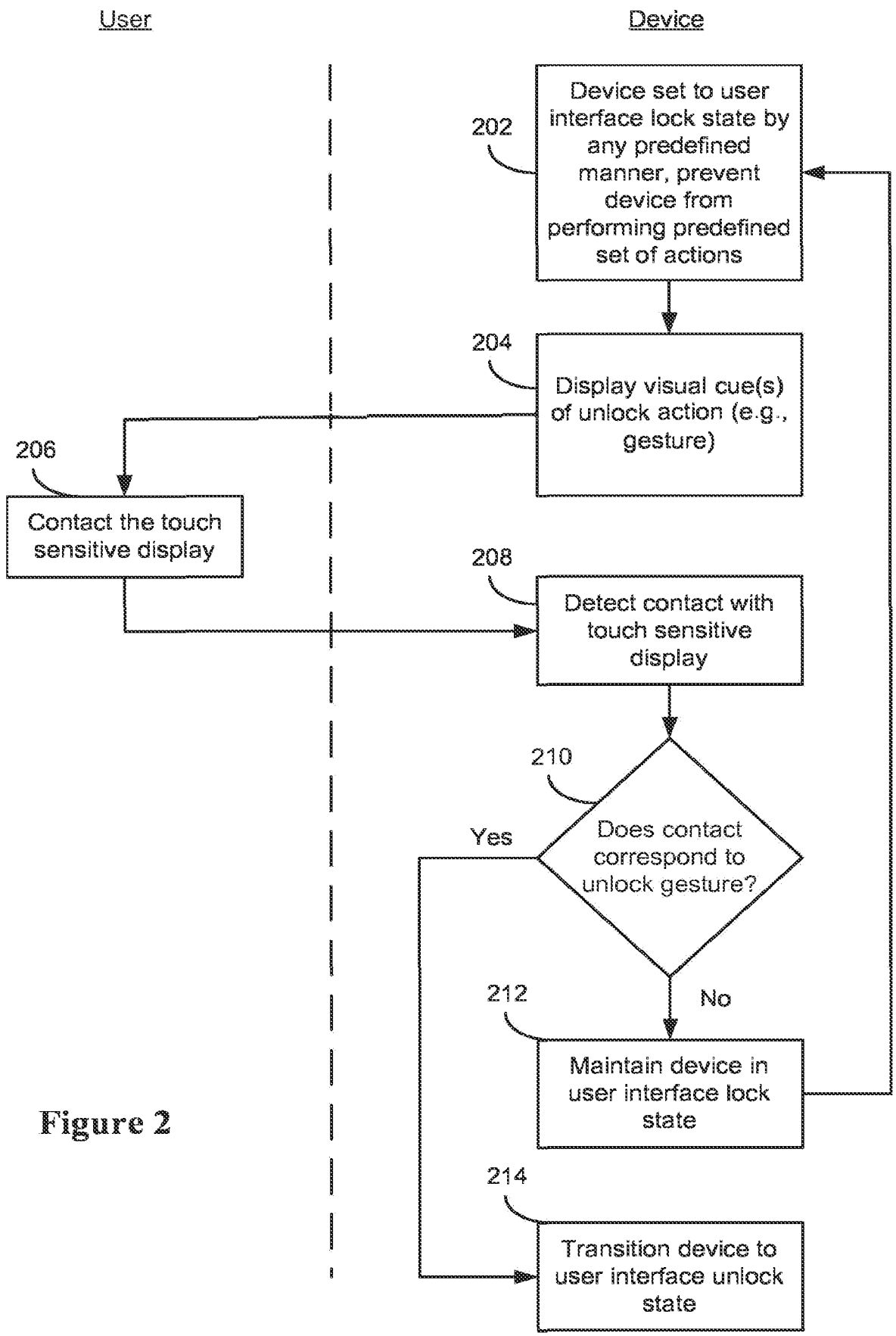
FIG. 2 is a flow diagram illustrating a process for transitioning a device to a user-interface unlock state, according to some embodiments of the invention.

FIG. 2 is a flow diagram illustrating a process 200 for transitioning a device to a user-interface unlock state, according to some embodiments of the invention. As used herein, transitioning from one state to another refers to the process of going from one state to another. The process may be, as perceived by the user, instantaneous, near-instantaneous, gradual or at any suitable rate. The progression of the process may be controlled automatically by the device, such as the device 100 (FIG. 1), independent of the user, once the process is activated; or it may be controlled by the user. While the process flow 200 described below includes a number of operations that appear to occur in a specific order, it should be apparent that these processes may include more or fewer operations, which may be executed serially or in parallel (e.g., using parallel processors or a multi-threading environment).

A device is set to the lock state (202). The device may be set (that is, transition completely to the lock state from any other state) to the locked state upon satisfaction of any of one or more lock conditions. The lock conditions may include events such as the elapsing of a predefined time of inactivity, entry into an active call, or powering on the device. The lock conditions may also include user intervention, namely the user locking the device by a predefined user input. In some embodiments, the user may be allowed to specify the events that serve as lock conditions. For example, the user may configure the device to transition to the lock state upon the elapsing of a predefined time of inactivity but not upon powering on the device.

In some embodiments, the locked device displays on the touch screen one or more visual cues of an unlock action that the user may perform to unlock the device (204). The visual cue(s) provide hints or reminders of the unlock action to the user. The visual cues may be textual, graphical or any combination thereof. In some embodiments, the visual cues are displayed upon particular events occurring while the device is locked. The particular events that trigger display of the visual cues may include an incoming call, incoming message, or some other event that may require the user's attention. In some embodiments, the visual cues may also be displayed upon particular user inputs, such as the user interacting with the menu button, the user making contact with the locked touch screen and/or the user interacting with any other input/control device. The locked device, when not displaying the visual cues, may power down the touch screen (which helps to conserve power) or display other objects on the touch screen, such as a screen saver or information that may be of interest to the user (e.g., battery charge remaining, date and time, network strength, etc.).

The unlock action includes contact with the touch screen. In some embodiments, the unlock action is a predefined gesture performed on the touch screen. As used herein, a gesture is a motion of the object/appendage making contact with the touch screen. For example, the predefined gesture may include a contact of the touch screen on the left edge (to initialize the gesture), a horizontal movement of the point of contact to the opposite edge while maintaining continuous contact with the touch screen, and a breaking of the contact at the opposite edge (to complete the gesture).

While the touch screen is locked, the user may initiate contact with the touch screen, i.e., touch the touch screen (206). For convenience of explanation, contact on the touch screen in the process 200 and in other embodiments described below will be described as performed by the user using at least one hand using one or more fingers. However, it should be appreciated that the contact may be made using any suitable object or appendage, such as a stylus, finger, etc. The contact may include one or more taps on the touch screen, maintaining continuous contact with the touch screen, movement of the point of contact while maintaining continuous contact, a breaking of the contact, or any combination thereof.

The device detects the contact on the touch screen (208). If the contact does not correspond to an attempt to perform the unlock action, or if the contact corresponds to a failed or aborted attempt by the user to perform the unlock action (210—no), then the device remains locked (212). For example, if the unlock action is a horizontal movement of the point of contact across the touch screen while maintaining continuous contact with the touch screen, and the detected contact is a series of random taps on the touch screen, then the device will remain locked because the contact does not correspond to the unlock action.

If the contact corresponds to a successful performance of the unlock action, i.e., the user performed the unlock action successfully (210—yes), the device transitions to the unlock state (214). For example, if the unlock action is a horizontal movement of the point of contact across the touch screen while maintaining continuous contact with the touch screen, and the detected contact is the horizontal movement with the continuous contact, then the device transitions to the unlock state.

In some embodiments, the device begins the process of transitioning to the unlock state upon detection of any contact on the touch screen and aborts the transition as soon as the device determines that the contact does not correspond to an unlock action or is a failed/aborted unlock action. For example, if the unlock action is a predefined gesture, the device may begin the process of transitioning to the unlock state as soon as it detects the initial contact of the gesture and continues the progression of the transition as the gesture is performed. If the user aborts the gesture before it is completed, the device aborts the transition and remains in the lock state. If the gesture is completed, the device completes the transition to the unlock state and becomes unlocked. As another example, if the unlock action is a horizontal movement of the point of contact across the touch screen while maintaining continuous contact with the touch screen, and the user taps the touch screen once, the device begins the process of the state transition as soon as it detects the tap but also aborts the process soon after because it realizes that the tap is just a tap and does not correspond to the unlock action.

While the device is unlocked, the device may display on the touch screen user-interface objects corresponding to one or more functions of the device and/or information that may be of interest to the user. The user-interface objects are objects that make up the user interface of the device and may include, without limitation, text, images, icons, soft keys (or "virtual buttons"), pull-down menus, radio buttons, check boxes, selectable lists, and so forth. The displayed user-interface objects may include non-interactive objects that convey information or contribute to the look and feel of the user interface, interactive objects with which the user may interact, or any combination thereof. The user may interact with the user-interface objects by making contact with the touch screen at one or more touch screen locations corresponding to the interactive objects with which she wishes to interact. The device detects the contact and responds to the detected contact by performing the operation(s) corresponding to the interaction with the interactive object(s).

While the device is locked, the user may still make contact on the touch screen. However, the locked device is prevented from performing a predefined set of actions in response to any detected contact until the device is unlocked. The prevented predefined set of action may include navigating between user interfaces and entry of data by the user.

While the device is locked, the device may display one or more visual cues of the unlock action, as described above. In some embodiments, the device may also display, along with the visual cues, an unlock image. The unlock image is a graphical, interactive user-interface object with which the user interacts in order to unlock the device. In other words, the unlock action is performed with respect to the unlock image. In some embodiments, performing the unlock action with respect to the image includes dragging the unlock image in a predefined manner, which moves the unlock image across the touch screen. In some embodiments, if the unlock action is not completed, the GUI display can show reverse progress towards the locked state by gradually returning the unlock image to its position in the locked state.

In some embodiments, in addition to visual feedback, the electronic device supplies non-visual feedback to indicate progress towards completion of the unlock action. In some embodiments, in addition to visual feedback, the electronic device supplies non-visual feedback to indicate completion of the unlock action. The additional feedback may include audible feedback (e.g., sound(s)) or physical feedback (e.g., vibration(s)).

Figure 3:
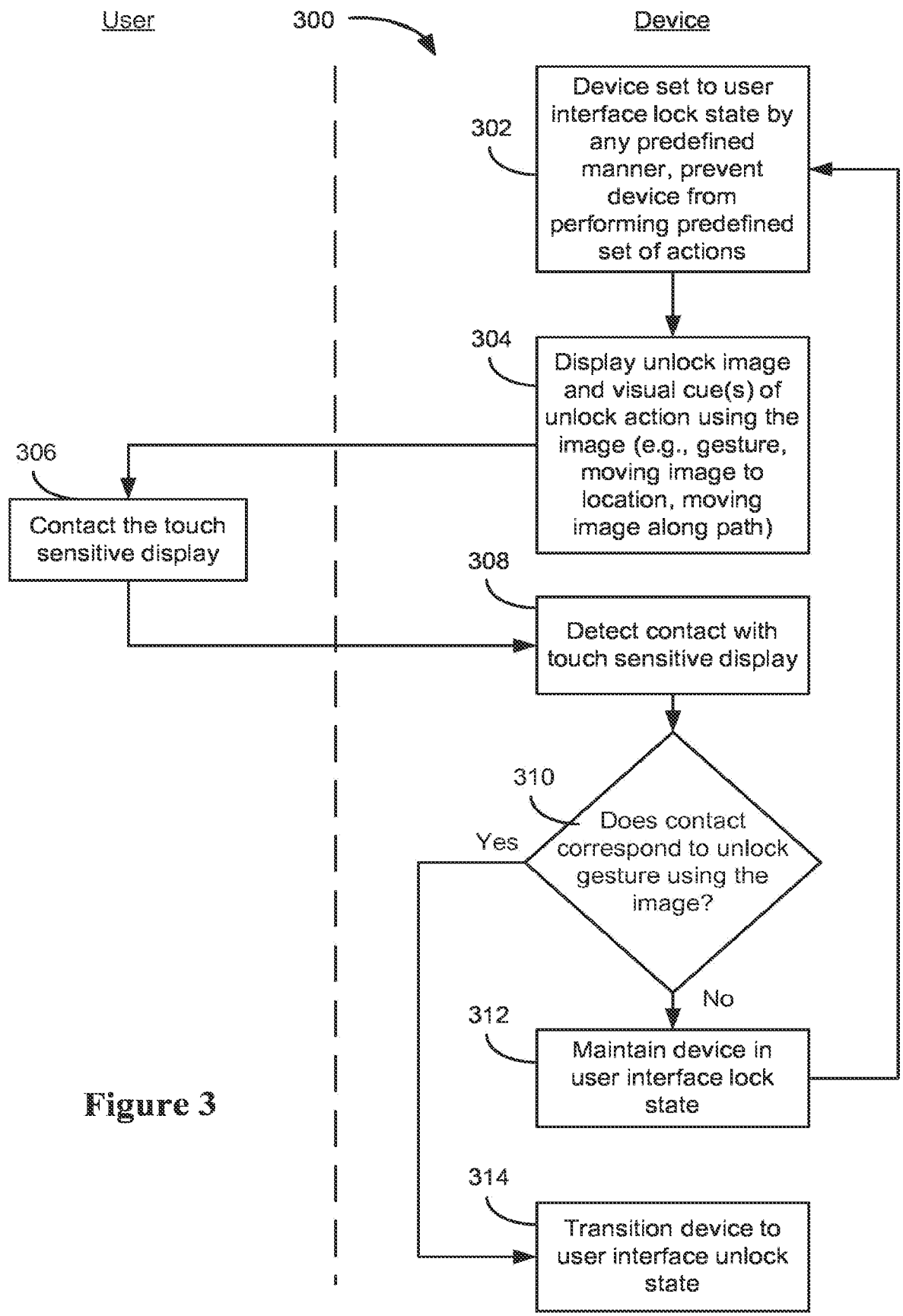
FIG. 3 is a flow diagram illustrating a process for transitioning a device to a user-interface unlock state, according to some embodiments of the invention.

FIG. 3 is a flow diagram illustrating a process 300 for transitioning a device to a user-interface unlock state using an unlock image, according to some embodiments of the invention. The process 300 is similar to the process 200 (FIG. 2) with the addition of an unlock image that is displayed with the visual cues. The unlock action in the process 300 is performed with respect to the unlock image, i.e., the unlock action includes interaction with the unlock image. While the process flow 300 described below includes a number of operations that appear to occur in a specific order, it should be apparent that these processes can include more or fewer operations, which can be executed serially or in parallel (e.g., using parallel processors or a multi-threading environment).

The device is locked upon satisfaction of a lock condition (302), similar to the operation 202 (FIG. 2). An unlock image and visual cues of the unlock action using the unlock image are displayed (304). The operation 304 is the same as the operation 204 (FIG. 2), except that in the operation 304 an unlock image is displayed in addition to the visual cues.

As described above, the unlock action includes interaction with the unlock image. In some embodiments, the unlock action includes the user performing a predefined gesture with respect to the unlock image. In some embodiments, the gesture includes dragging the unlock image to a location on the touch screen that meets one or more predefined unlock criteria. In other words, the user makes contact with the touch screen at a location corresponding to the unlock image and then performs the predefined gesture while maintaining continuous contact with the touch screen, dragging the image to the location that meets the predefined unlock criteria. In some embodiments, the unlock action is completed by breaking the contact with the touch screen (thus releasing the unlock image) upon completion of the predefined gesture.

A location meeting one or more predefined unlock criteria is simply a location on the touch screen that is predefined as a location to which the unlock image is to be dragged in order to unlock the device. The location(s) may be defined narrowly or broadly and may be one or more particular locations on the touch screen, one or more regions on the touch screen, or any combination thereof. For example, the location may be defined as a particular marked location, areas at each of the four corners of the touch screen, or a quadrant of the touch screen, etc.

In some embodiments, the interaction includes dragging the unlock image to a predefined location on the touch screen. For example, the unlock action may include dragging the unlock image from one corner of the touch screen to another corner of the touch screen. As another example, the unlock action may include dragging the unlock image from one edge of the touch screen to the opposite edge. The emphasis here is on the final destination of the unlock image (and of the finger). Thus, the user can drag the unlock image from its initial location along any desired path. As long as the unlock image reaches the predefined location and is released at that location, the device is unlocked. It should be appreciated that the predefined location may be, as described above, defined narrowly or broadly and may be one or more particular locations on the touch screen, one or more regions on the touch screen, or any combination thereof.

In some other embodiments, the unlock action includes dragging the unlock image along a predefined path. For example, the unlock action may include dragging the unlock image clockwise along the perimeter of the touch screen (the path being the perimeter of the touch screen), from one of the corners and back. As another example, the unlock action may include dragging the unlock image from one edge of the touch screen to the opposite edge in a linear path. The emphasis here is on the path along which the unlock image (and the finger) moves. Because of the emphasis on the path, the final location to which the unlock image is to be moved may be defined broadly. For example, the unlock action may be to drag the unlock image from its initial location, along the predefined path, to any spot within a predefined region on the touch screen. The predefined path may include one or more straight lines or lines with twists and turns.

The user makes contact with the touch screen (306), similar to the operation 206 (FIG. 2). The device detects the contact with the touch screen (308), similar to the operation 208 (FIG. 2). If the contact does not correspond to successful performance of the unlock action with respect to the image (310—no), the device remains locked. If the contact does correspond to successful performance of the unlock action with respect to the image (310—yes), the device is unlocked (314).

Figure 4A:
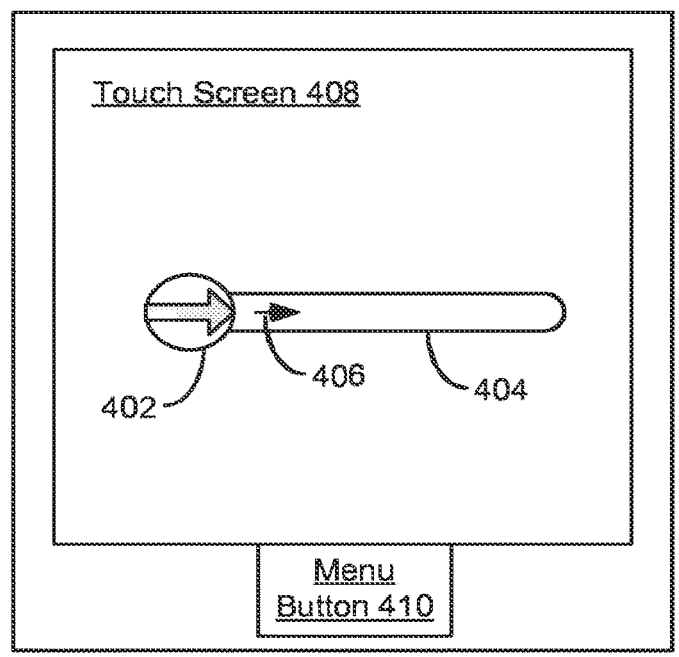
FIGS. 4A-4B illustrate the GUI display of a device in a user-interface lock state, according to some embodiments of the invention.
Figure 4B:
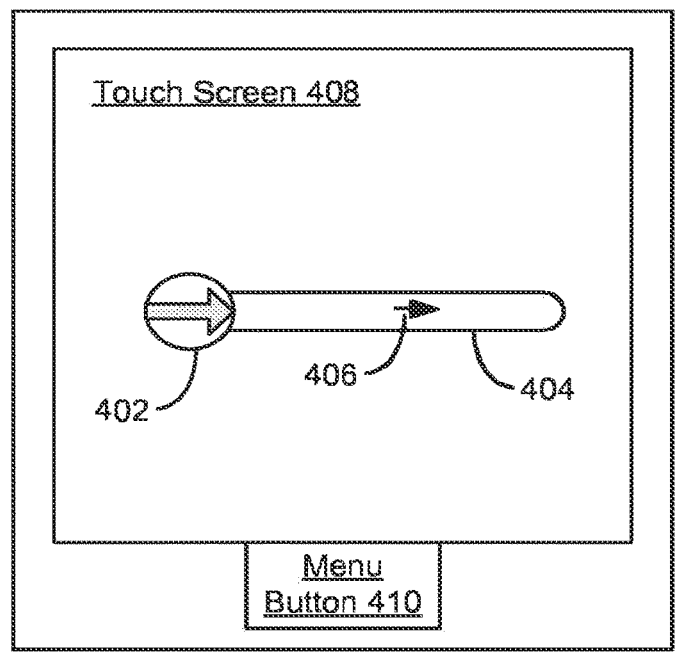

FIGS. 4A-4B illustrate the GUI display of a device in a user-interface lock state, according to some embodiments of the invention. In FIG. 4A, device 400 includes a touch screen 408 and a menu button 410. The device 400 is locked and the touch screen 408 is displaying an unlock image 402 and visual cues. The visual cues shown include a channel 404 indicating the path of the gesture/movement along which the unlock image 402 is to be dragged, similar to a groove along which a slider switch moves; and one or more arrows 406 indicating the direction of the gesture/movement. The end of the channel 404 (in FIGS. 4A-4B and 5A-5D, the "end" of the channel is the right end) also serves as a predefined location to which the unlock image 402 is to be dragged. The unlock image 402 may also include an arrow to further remind the user the direction of the gesture/movement. As described above, the visual cues and the unlock image may be displayed by the device 400 upon an event that may require the user's attention (e.g., incoming call or message) or upon user intervention (e.g., the user pressing the menu button 410 while the device is locked).

In some embodiments, the arrows 406 and the arrow on the unlock image 402 may be animated. For example, the arrow on the unlock image 402 may appear and disappear in a pulse-like manner and the arrows 406 may emanate from one end of the channel 404 in sync with the pulsing of the arrow on the unlock image 402. As shown in FIG. 4B, the arrow 406 may move along the channel 404 and disappear when it moves to the end of the channel 404.

The visual cues illustrated in FIGS. 4A and 4B remind the user that the unlock action is a predefined gesture that includes a horizontal movement of the finger (and thus moving the point of contact) along the channel 404, from the beginning of the channel 404, where the unlock image is initially located, to the end of the channel 404. It should be appreciated, however, that the visual cues shown in FIGS. 4A-4B are merely exemplary and that more or fewer visual cues, or alternative visual cues may be used. The content of the visual cues may be based on the particulars of the unlock action.

Figure 5A:
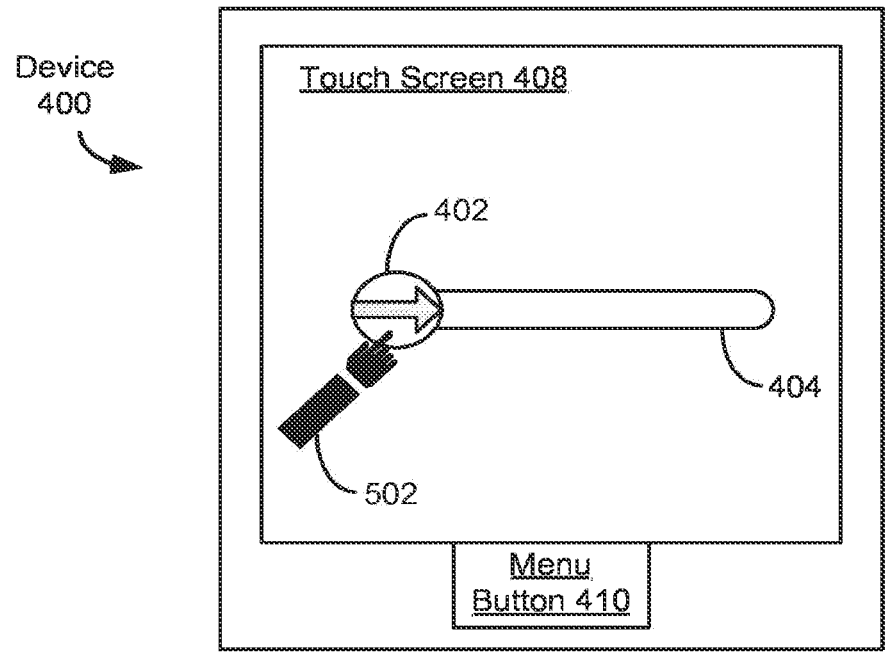
FIGS. 5A-5D illustrate the GUI display of a device at various points of the performance of an unlock action gesture, according to some embodiments of the invention.

FIGS. 5A-5D illustrate the GUI display of a device at various points of the performance of an unlock action gesture, according to some embodiments of the invention. In FIG. 5A, the user, represented by the hand and finger 502 (not drawn to scale), begins the unlock action by touching the touch screen 408 of device 400 with her finger 502. In some embodiments, the touch screen 408 is initially in sleep mode and/or dark, and the screen 408 displays the unlock image 402 when touched. The user touches the touch screen 408 at the location corresponding to the unlock image 402, which is located initially at the left end of the channel 404. The contact, either overlapping with the unlock image 402 or in proximity to the unlock image 402, is detected by the device 400 and is determined to be an attempt to unlock the touch screen, based on the fact that the user 502 is interacting with the unlock image 402.

Figure 5B:
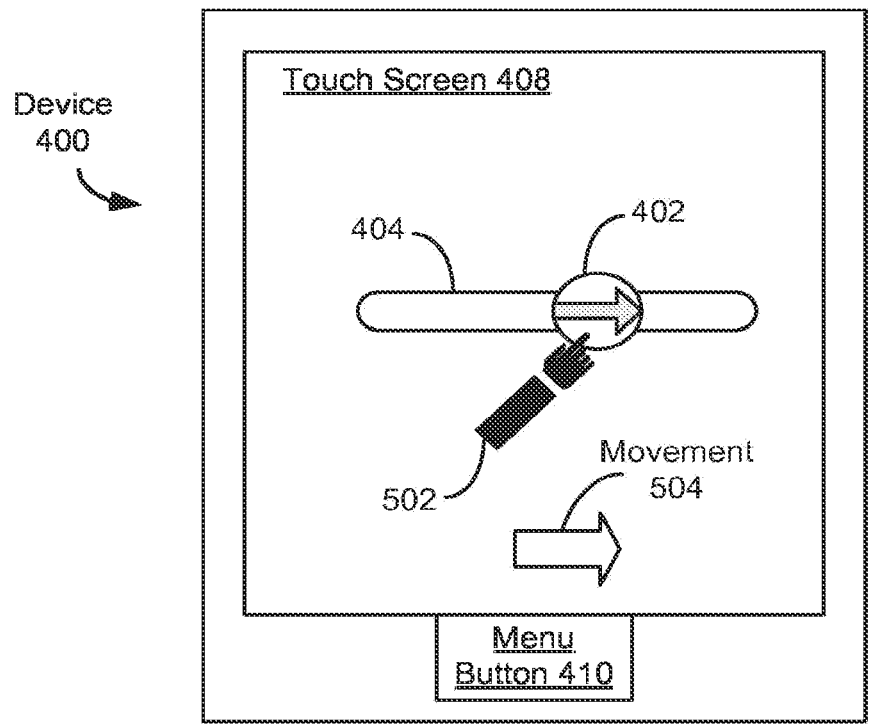

In FIG. 5B, the user is in the process of performing the gesture by moving her finger, which is in continuous contact with the touch screen 408, in the direction of movement 504. The unlock image 402 is dragged along the channel 404 as a result of the gesture. The channel 404 reminds the user that the unlock gesture is a horizontal motion. In some embodiments, the channel 404 indicates the predefined location (in FIGS. 5A-5D, the right end of the channel) to which the user drags the unlock image 402 to complete the unlock action and/or the predefined path along which the user drags the unlock image 402 to complete the unlock action.

Figure 5C:
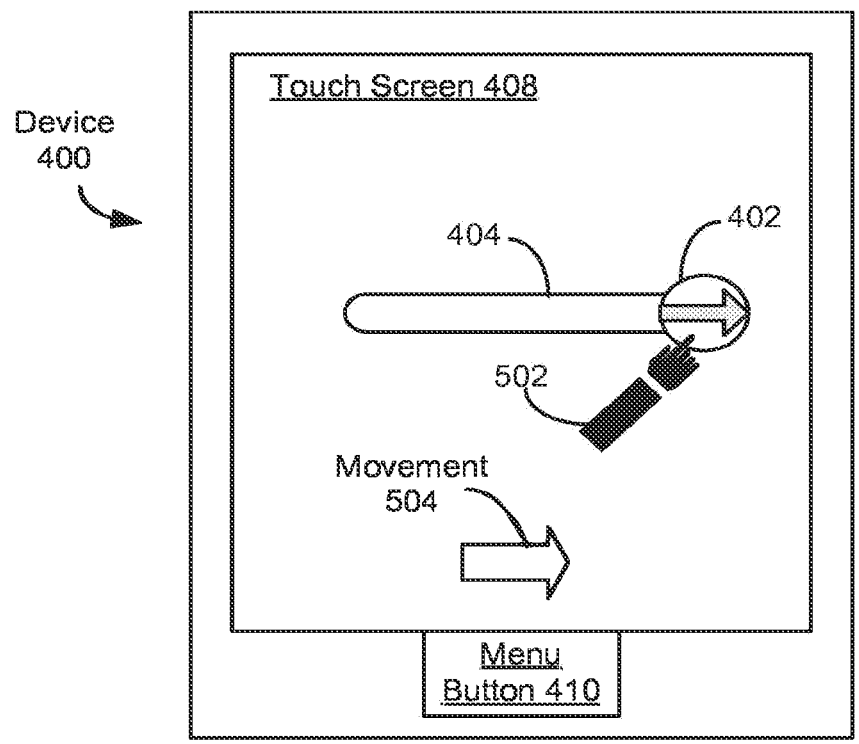
Figure 5D:
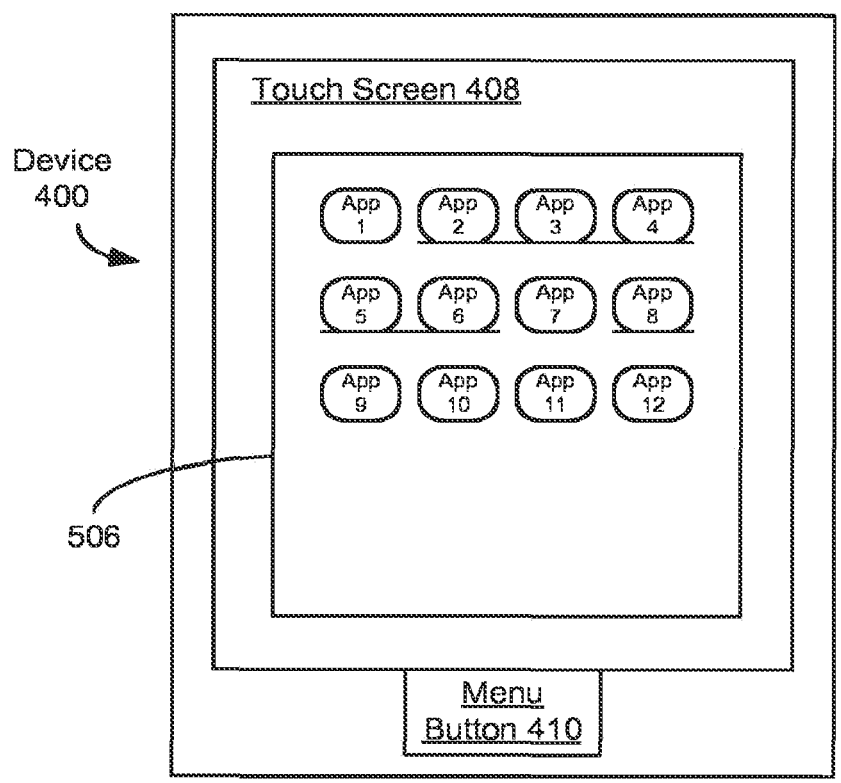

In FIG. 5C, the user has dragged the unlock image 402 to the right end of the channel 404. Once the user releases the unlock image 402 at the right end of the channel 404, the unlock action is complete. Upon completion of the unlock gesture, the device unlocks and displays on the touch screen 408 user-interface objects associated with normal operation of the device 400. FIG. 5D illustrates an example of user-interface objects that may be displayed when the device 400 is unlocked. In FIG. 5D, the device 400 displays a menu 506. The menu 506 includes interactive user-interface objects corresponding to various applications or operations. A user may interact with the user-interface objects to activate an application or perform an operation. It should be appreciated, however, that the device 400, upon being unlocked, may display additional or alternative user-interface objects.

In some embodiments, the unlock image 402 may also be used to indicate failure of performance of the unlock action. For example, if the user breaks the contact with the touch screen before the unlock image reaches the right end of the channel 404, the unlock action has failed. The device 400 may display the unlock image 402 returning to its initial position on the left end of the channel 404, allowing the user to attempt the unlock action again, if she so chooses. In some embodiments, the device goes back to sleep if no gesture is applied in a predetermined period of time.

In some embodiments, the user may unlock the device 400 by contacting the touch screen 408 and moving the point of contact horizontally along a fraction of the channel 404, i.e., the user need not move all the way to the right end of the channel. In some embodiments, the user may unlock the device 400 by making contact anywhere on the touch screen 408 and moving the point of contact horizontally as if he or she were following the channel 404.

In some embodiments, the lock/unlock feature may apply to specific applications that are executing on the device 400 as opposed to the device 400 as a whole. In some embodiments, an unlock gesture transitions from one application to another, for example, from a telephone application to a music player or vice versa. The lock/unlock feature may include a hold or pause feature. In some embodiments, as the user transitions from a first application and to a second application, a user interface for the second application may fade in (i.e., increase in intensity) and a user interface for the first application may fade out (i.e., decrease in intensity). The fade in and fade out may occur smoothly over a pre-determined time interval, such as 0.2 s, 1 s or 2 s. The pre-determined time interval may be in accordance with the unlock gesture, such as the time it takes the user to perform the gesture.

Indication of Progress Towards Satisfaction of a User Input Condition

Figure 6:
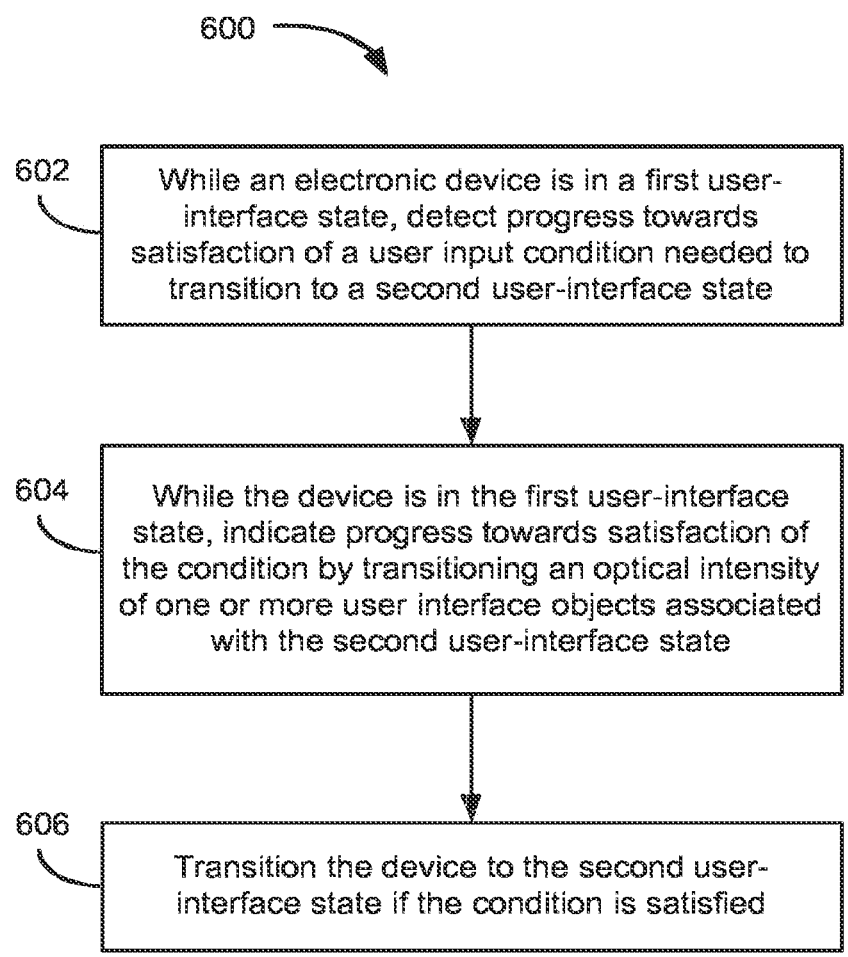
FIG. 6 is a flow diagram illustrating a process for indicating progress towards satisfaction of a user input condition according to some embodiments of the invention.

FIG. 6 is a flow diagram illustrating a process 600 for indicating progress towards satisfaction of a user input condition according to some embodiments of the invention. While the process flow 600 described below includes a number of operations that appear to occur in a specific order, it should be apparent that these processes can include more or fewer operations, which can be executed serially or in parallel (e.g., using parallel processors or a multi-threading environment).

While an electronic device is in a first user-interface state, progress is detected (602) towards satisfaction of a user input condition needed to transition to a second user-interface state. In some embodiments, the first user-interface state is for a first application and the second user-interface state is for a second application. In some embodiments, the first user-interface state is a lock state and the second user-interface state is an unlock state.

While the device is in the first user-interface state, progress is indicated (604) towards satisfaction of the condition by transitioning an optical intensity of one or more user interface objects associated with the second user-interface state. The change in optical intensity of the user-interface objects provides a user with sensory feedback of the progress in transitioning between user interface states.

In some embodiments, in addition to visual feedback, the device supplies non-visual feedback to indicate progress towards satisfaction of the user input condition. The additional feedback may include audible feedback (e.g., sound(s)) or physical feedback (e.g., vibration(s)).

The device transitions (606) to the second user-interface state if the condition is satisfied. In some embodiments, in addition to visual feedback, the device supplies non-visual feedback to indicate satisfaction of the user input condition. The additional feedback may include audible feedback (e.g., sound(s)) or physical feedback (e.g., vibration(s)).

The optical intensity of a user-interface object, as used herein, is the object's degree of visual materialization. The optical intensity may be measured along a scale between a predefined minimum and a predefined maximum. In some embodiments, the optical intensity may be measured along a logarithmic scale. In some embodiments, the optical intensity may be perceived by users as a transparency effect (or lack thereof) applied to the user-interface object. In some embodiments, the minimum optical intensity means that the object is not displayed at all (i.e., the object is not perceptible to the user), and the maximum optical intensity means that the object is displayed without any transparency effect (i.e., the object has completely materialized visually and is perceptible to the user). In some other embodiments, the optical intensity may be the visual differentiation between the user-interface object and the background, based on color, hue, color saturation, brightness, contrast, transparency, and any combination thereof.

In some embodiments, the optical intensity of the user-interface objects to be displayed in the second user-interface state is increased smoothly. Smoothly may include a transition time that is greater than a pre-defined threshold, for example, 0.2 s, 1 s or 2 s. The rate of the transition of the optical intensity may be any predefined rate.

In some embodiments, the indication of progress towards completion of the user input condition is a function of the user's satisfaction of the condition. For example, for a transition to an unlock state, the indication of progress towards completion is a function of the user's performance of an unlock action. For a linear function, the indication of progress is 10% complete when the unlock action is 10% complete; the indication of progress is 50% complete when the unlock action is 50% complete, and so forth, up to 100% completion of the unlock action, at which point the transition to the unlock state occurs. Correspondingly, for a linear function, the transition of the optical intensity from an initial value to a final value is 10% complete when the unlock action is 10% complete; the transition is 50% complete when the unlock action is 50% complete, and so forth, up to 100% completion of the unlock action, at which point the optical intensity is at its final value. In some embodiments, the user may perceive the optical intensity transition as a fading in of the user-interface objects as the unlock action is performed. It should be appreciated that the function need not be linear and alternative functions may be used, further details of which are described below, in relation to FIGS. 8A-8C.

If the user input condition includes a predefined gesture then the indication of progress of the gesture may be defined in terms of how much of the gesture is completed and how much of the gesture is remaining. For example, if the gesture includes moving the finger from one edge of the screen to the opposite edge horizontally, then the indication of progress may be defined in terms of the distance between the two edges because the distance remaining objectively measures how much further the user has to move her finger to complete the gesture.

If the user input condition includes dragging an image to a predefined location, then the indication of progress may be defined in terms of the distance between the initial location of the image and the predefined location to which the image is to be dragged in order to complete the input condition.

If the user input condition includes dragging an image along a predefined path, then the indication of progress may be defined in terms of the length of the predefined path.

Figure 7A:
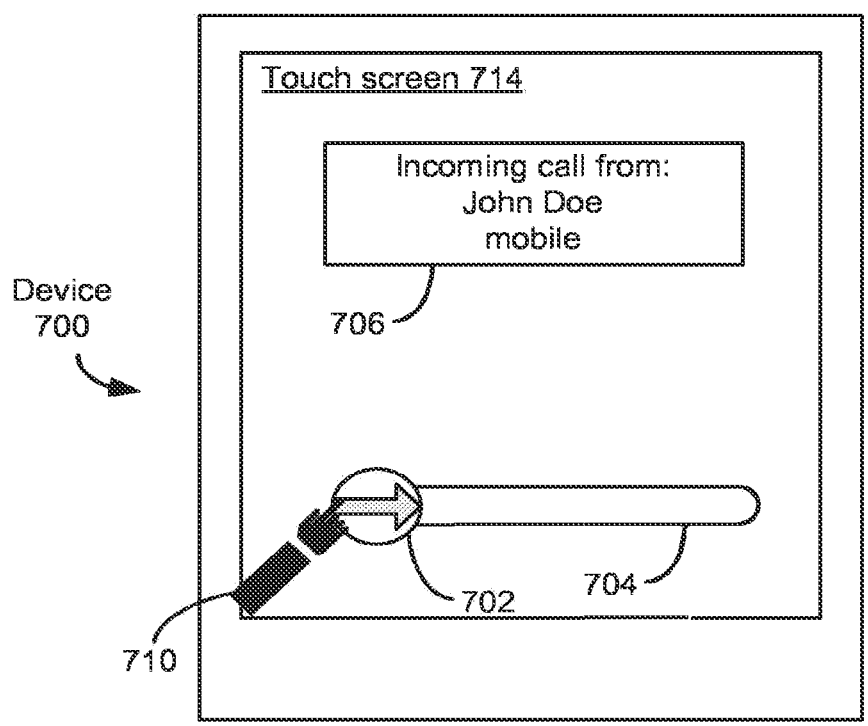
FIGS. 7A-7D illustrate the GUI display of a device that is transitioning the optical intensity of user-interface objects, according to some embodiments of the invention.

FIGS. 7A-7D illustrate the GUI display of a device that is transitioning the optical intensity of user-interface objects concurrent with a transition from a first user interface state to a second user interface state, according to some embodiments of the invention. In FIG. 7A, the device 700 is locked and has received an incoming call. The device 700 is displaying a prompt 706 to the user, informing the user of the incoming call, on the touch screen 714. The device is also displaying the unlock image 702 and channel 704 so that the user can unlock the device 700 in order to accept or decline the incoming call. The user begins the unlock action by making contact on the touch screen with her finger 710 on the unlock image 702.

Figure 7B:
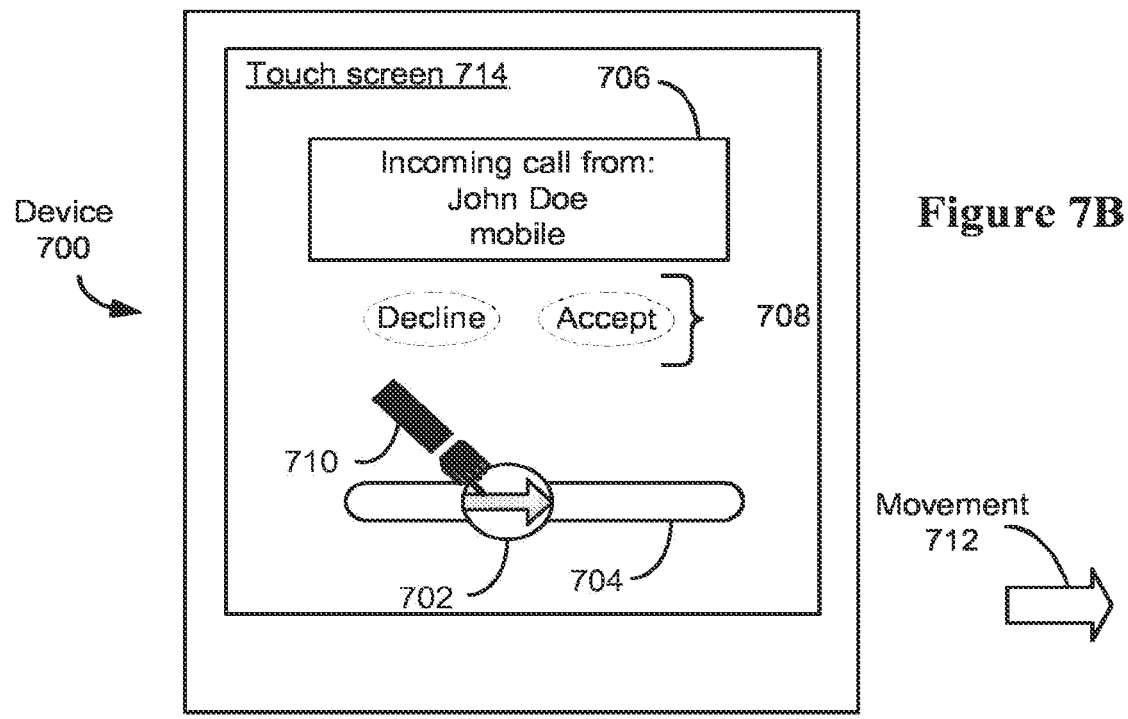
Figure 7C:
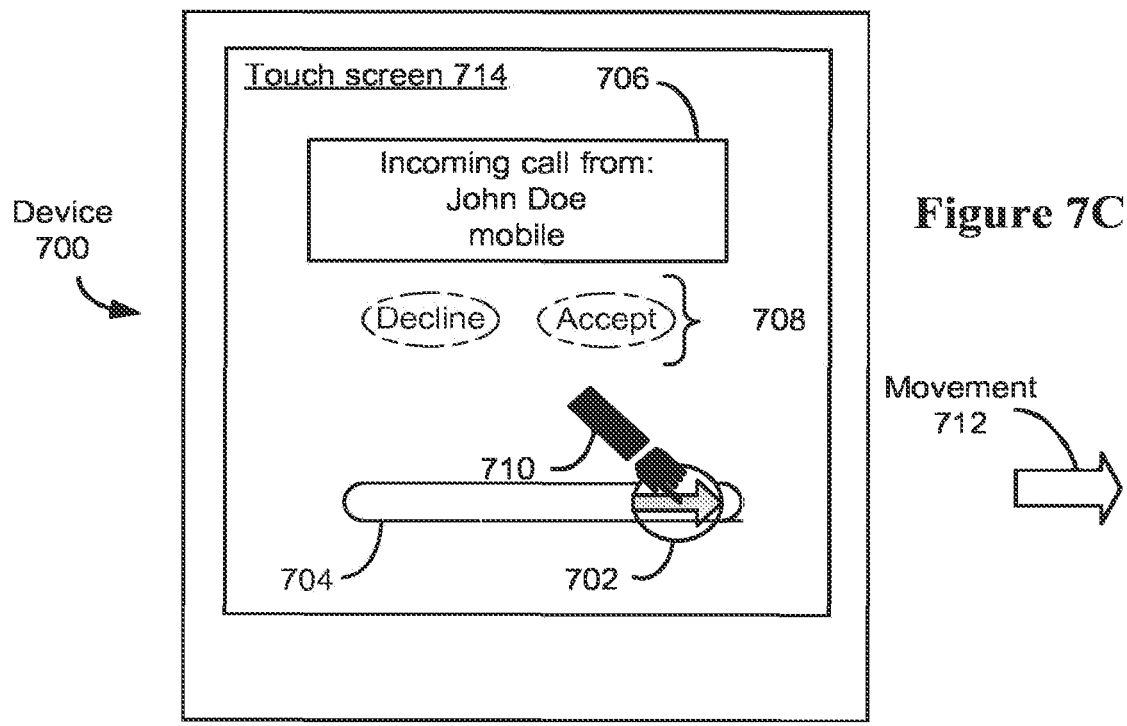

In FIG. 7B, the user is in the process of dragging the unlock image 702 along the channel 704 in the direction of movement 712. As the user drags the unlock image, a set of virtual buttons 708 appears and increases in optical intensity. The virtual buttons 708 are shown with dotted outlines to indicate that they are not yet at their final optical intensity levels. The virtual buttons 708 are associated with the prompt 706; the virtual buttons shown in FIG. 7B-7D allow the user to decline or accept the incoming call. However, the user cannot interact with the virtual buttons 708 until the device is unlocked and the virtual buttons have reached their final optical intensity. In FIG. 7C, the user drags the unlock image 702 further along the channel 704 in the direction of movement 712. The virtual buttons 708 have increased further in optical intensity relative to their optical intensity in FIG. 7B, as illustrated by their different style of dotted outlines. The increases in optical intensity indicate to the user progress towards completion of the unlock action.

Figure 7D:
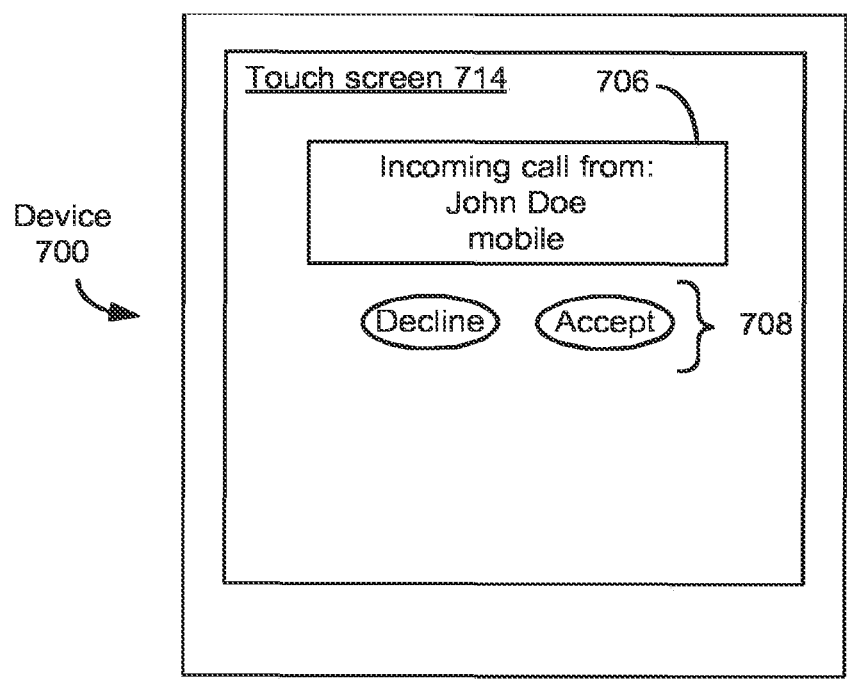

In FIG. 7D, the user completes the unlock action by dragging the unlock image to the right end of the channel 704 and releasing the unlock image 702. The device 700 transitions to the unlock state. The unlock image 702 and the channel 704 disappear from the display and the virtual buttons 708 are at their final optical intensity levels, as illustrated by their solid outlines. At this point the user may interact with the virtual buttons 708 and accept or decline the incoming call.

As described above in relation to FIGS. 5A-5D, if the unlock action fails because the user releases the unlock image prematurely, the unlock image may return to its initial location. In some embodiments, the optical intensity of the virtual buttons 708 or other user-interface objects that were increasing in optical intensity as the unlock action was performed may, concurrent with the return of the unlock image to its initial location, have their optical intensity decreased smoothly, back to their initial levels.

Figure 8A:
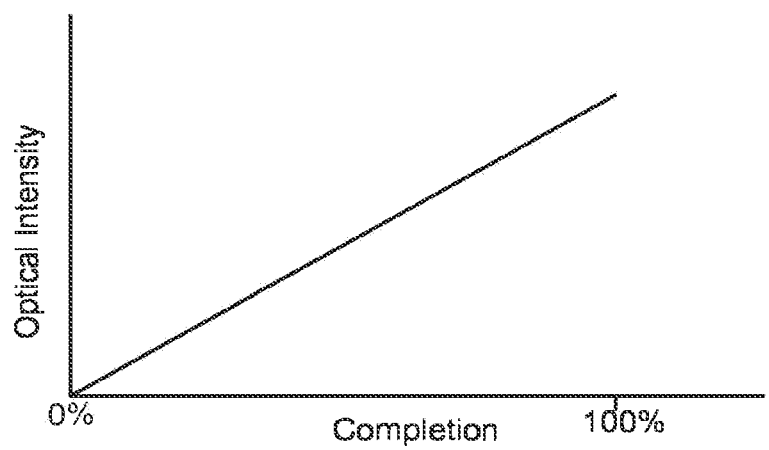
FIGS. 8A-8C are graphs illustrating optical intensity as a function of the completion of the user input condition, according to some embodiments of the invention.
Figure 8B:
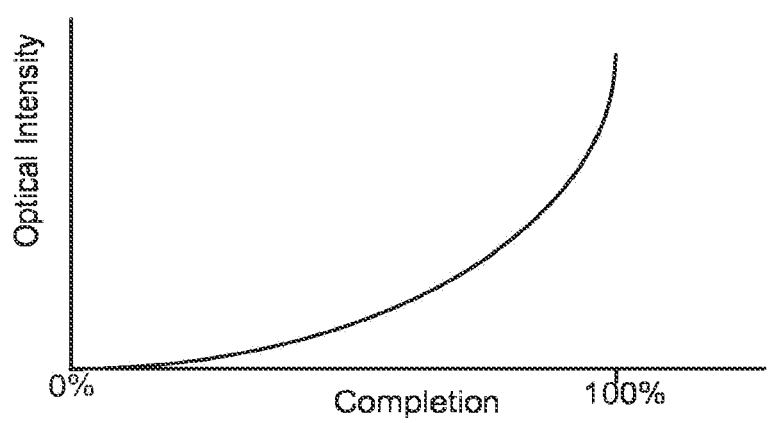
Figure 8C:
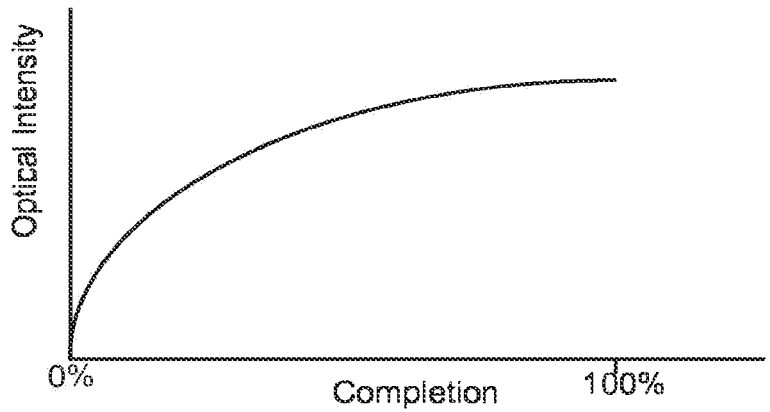

FIGS. 8A-8C are graphs illustrating optical intensity as a function of the completion of the user input condition, according to some embodiments of the invention. In FIG. 8A, the optical intensity is a linear function of the completion of the user input condition. At 0% completion, the optical intensity is at an initial value (in this case, the initial value is 0). As the completion percentage increases, the optical intensity increases linearly with the completion percentage, until it reaches the final value at 100% completion.

In FIG. 8B, the optical intensity is a nonlinear function of the completion of the user input condition. At 0% completion, the optical intensity is at an initial value (in this case, the initial value is 0). As the completion percentage increases, the optical intensity increases gradually at first, but the increase becomes steeper as the completion percentage increases, until it reaches the final value at 100% completion.

In FIG. 8C, the optical intensity is another nonlinear function of the completion of the user input condition. At 0% completion, the optical intensity is at an initial value (in this case, the initial value is 0). As the completion percentage increases, the optical intensity increases steeply at first, but the increase becomes more gradual as the completion percentage increases, until it reaches the final value at 100% completion. In some embodiments, the optical intensity may increase according to a logarithmic scale.

In some embodiments, the optical intensity may reach its final value prior to 100% completion of the user input condition (e.g., at 90% completion).

User Interface Active States Corresponding to Events or Applications

Figure 9:
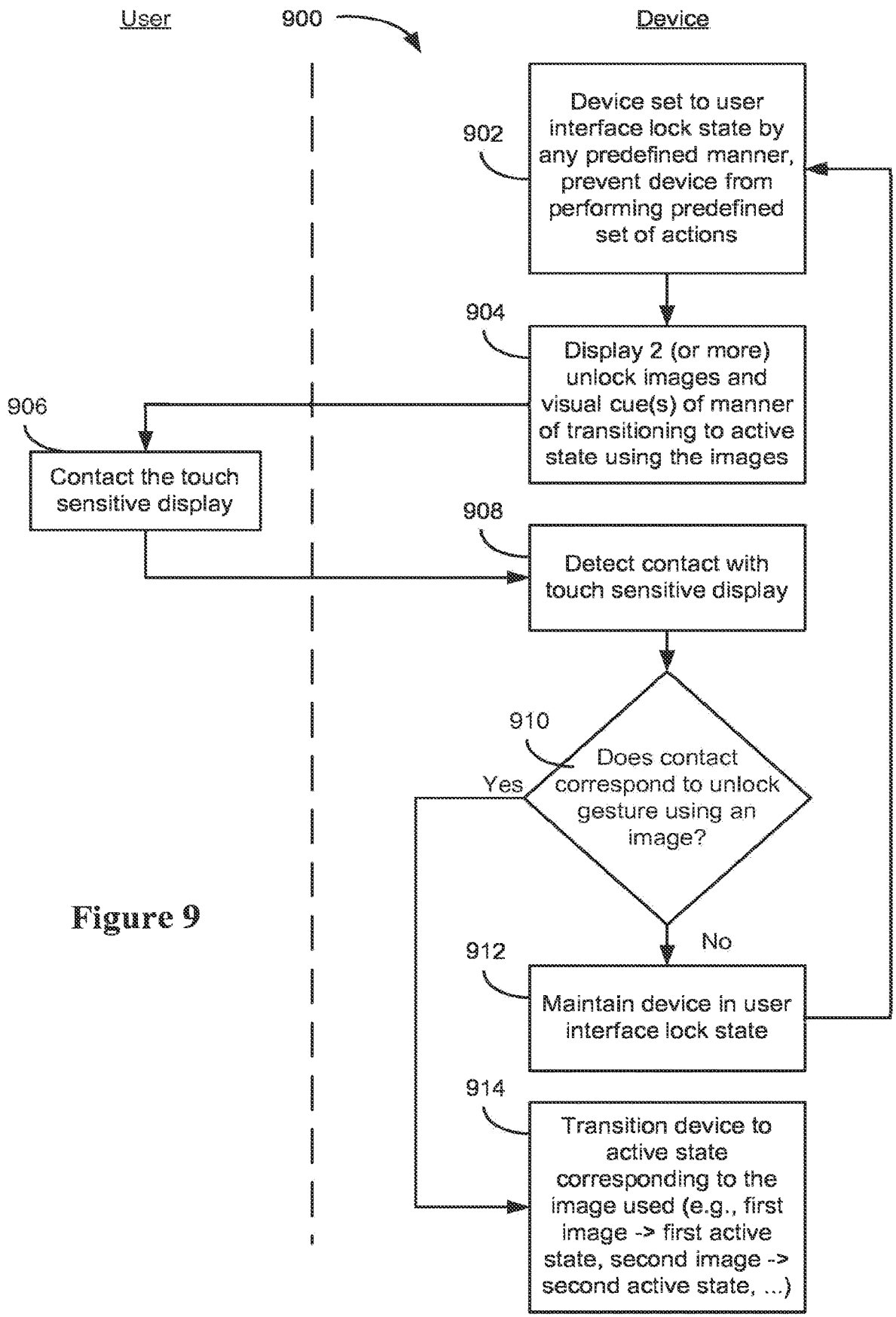
FIG. 9 is a flow diagram illustrating a process for transitioning a device to a user interface active state, according to some embodiments of the invention.

FIG. 9 is a flow diagram illustrating a process 900 for transitioning a device to a user interface active state corresponding to one of a plurality of unlock images, according to some embodiments of the invention. In some embodiments, the device may have one or more active applications running when the device becomes locked. Additionally, while locked, the device may continue to receive events, such as incoming calls, messages, voicemail notifications, and so forth. The device may display multiple unlock images on the touch screen, each unlock image corresponding to an active application or incoming event. Performing the unlock action using one of the multiple unlock images unlocks the device and displays the application and/or event corresponding to the unlock image. The user interface active state, as used herein, means that the device is unlocked and a corresponding application or event is displayed on the touch screen to the user. While the process flow 900 described below includes a number of operations that appear to occur in a specific order, it should be apparent that these processes can include more or fewer operations, which can be executed serially or in parallel (e.g., using parallel processors or a multi-threading environment).

The device is locked upon satisfaction of a predefined lock condition (902). The device may have active applications running when it is locked and the active applications may continue running while the device is locked. Additionally, while the device is locked, the device may receive events, such as incoming calls, messages, and voicemail notifications.

The device displays a plurality of unlock images, each displayed unlock image corresponding to an active application running or an event received while the device is locked (904). In some embodiments, the device also displays visual cues of the unlock action with respect to each unlock image. The device may display additional unlock images and visual cues as additional events are received. The user makes contact with the touch screen (906). The device detects the contact gesture (908). If the detected contact gesture does not correspond to successful performance of the unlock action with respect to any one of the displayed unlock images (e.g., because the contact is not an attempt to perform the unlock action or the unlock action failed/was aborted) (910 no), the device remains locked (912). If the detected contact gesture does correspond to successful performance of the unlock action with respect to one of the displayed unlock images (910—yes), the touch screen is unlocked and the running application or event corresponding to the one of the unlock images is displayed on the touch screen (914). In other words, the device transitions to a first active state corresponding to the first image if the detected contact corresponds to a predefined gesture with respect to the first image; the device transitions to a second active state distinct from the first active state and corresponding to the second image if the detected contact corresponds to a predefined gesture with respect to the second image; and so on.

The device becomes unlocked and makes the corresponding event or application visible to the user, active, or running in the foreground, as opposed to running in the background, upon performance of the unlock action with respect to the particular unlock image. The user-interface active state includes the running application or incoming event corresponding to the particular unlock image with which the user interacted being displayed prominently on the touch screen, in addition to the device being unlocked. Thus, unlocking using a first unlock image (if multiple unlock images are displayed) transitions the device to a first user-interface active state, in which the device is unlocked and the application/event corresponding to the first unlock image is displayed prominently. Unlocking using a second image transitions the device to a second user-interface active state, in which the device is unlocked and the application/event corresponding to the second unlock image is displayed prominently.

In some embodiments, the device may prioritize which unlock images to display. The device may display a subset of the corresponding unlock images on the touch screen at one time. The device may decide which subset to display based on one or more predefined criteria. For example, the device may display only unlock images corresponding to the most recent events and/or running applications. As another example, the device may display only unlock images corresponding to incoming events.

Figure 10:
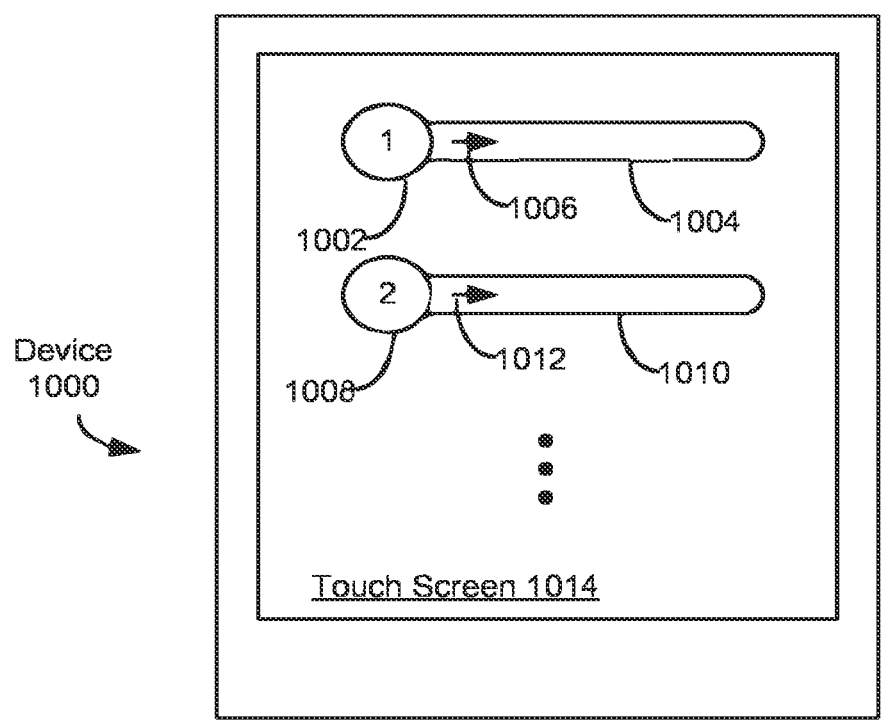
FIG. 10 illustrates the GUI of a device in a user-interface lock state that displays a plurality of unlock images, according to some embodiments of the invention.

FIG. 10 illustrates the GUI of a device 1000 in a user-interface lock state that displays a plurality of unlock images, according to some embodiments of the invention. In FIG. 10, the touch screen 1014 of the device 1000 is locked. A first unlock image 1002 is displayed with corresponding visual cues, such as the first channel 1004 and arrow 1006. A second unlock image 1008 is displayed with corresponding visual cues, such as the second channel 1010 and arrow 1012. The touch screen 1014 may display additional unlock images and visual cues. The first unlock image 1002 corresponds to a first running application or received event. The second unlock image 1008 corresponds to a second running application or received event. The first and second unlock images and visual cues are similar to the unlock image and visual cues described above, in relation to FIGS. 4A and 4B. The arrows 1006 and 1012 may be animated to move from one end of the channels 1004 and/or 1010 to the other end, in order to indicate the proper direction of the predefined gesture or movement of the unlock image.

Figure 11A:
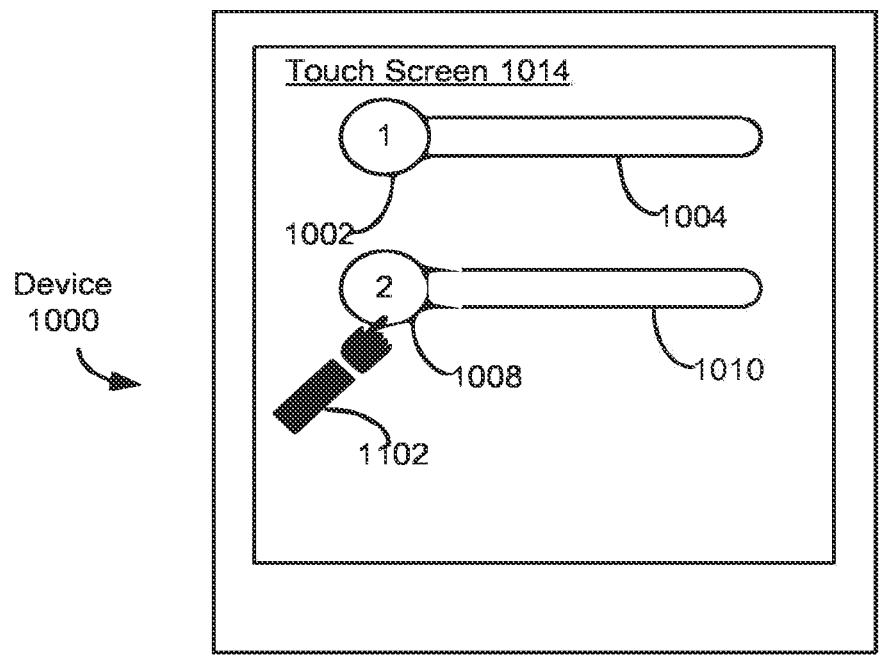
FIGS. 11A-11F illustrate the GUI display of a device at various points in the performance of an unlock action gesture, according to some embodiments of the invention.
Figure 11B:
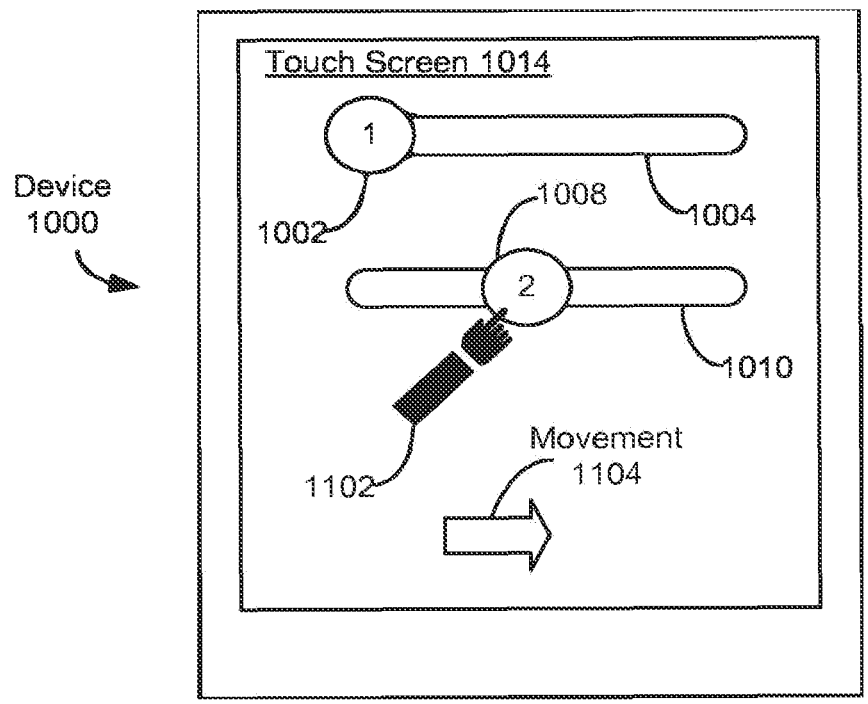

FIGS. 11A-11F illustrate the GUI display of a device at various points in the performance of an unlock action gesture corresponding to one of a plurality of unlock images, according to some embodiments of the invention. In FIG. 11A, the user makes contact with the touch screen 1014 using her finger 1102 (not shown to scale), at the location corresponding to the second unlock image 1008. The user performs the unlock action gesture by moving the point of contact, dragging the second unlock image 1008. FIG. 11B shows a snapshot of the device 1000 during the pendency of the unlock action. The second unlock image 1008 is moved along in the channel 1010 in the direction of movement 1104.

Figure 11C:
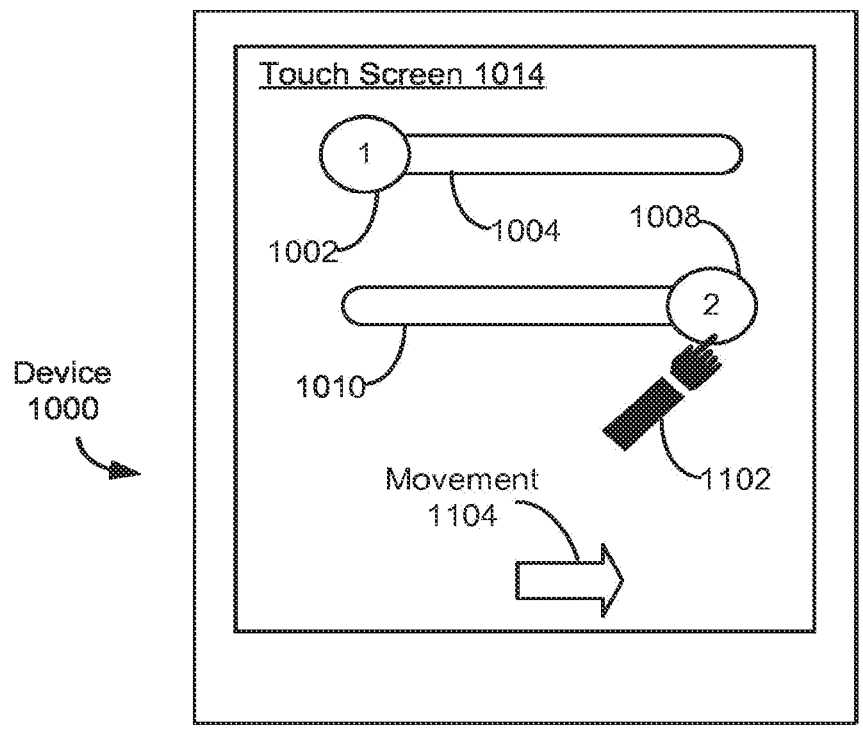
Figure 11D:
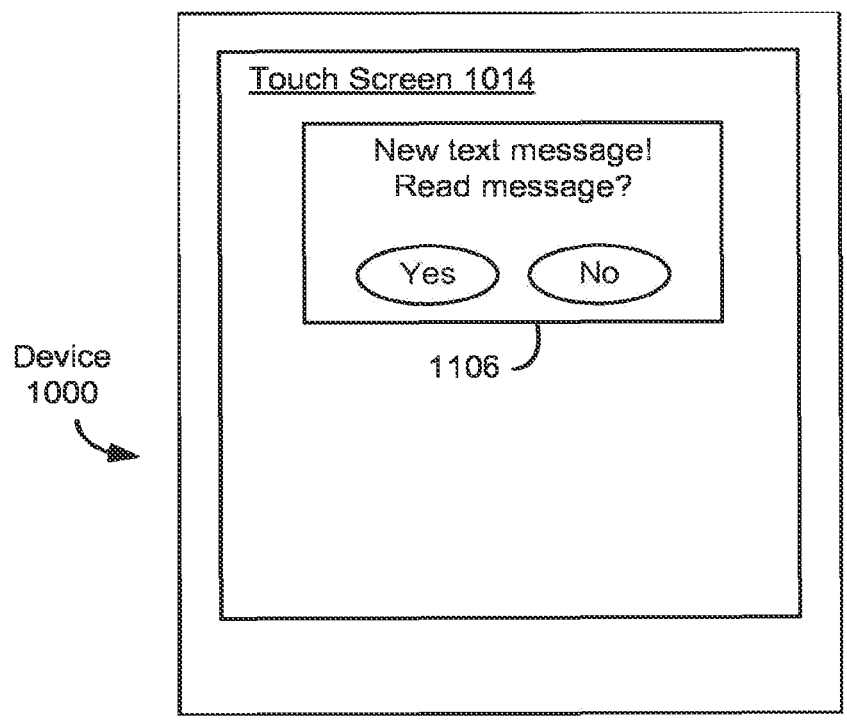

FIG. 11C shows the second unlock image 1008 moved to the end of the channel 1010, where the unlock action with respect to the second unlock image 1008 will be completed once the user breaks the contact (and releases the second unlock image 1008). In some embodiments, the unlock action is completed when the unlock image 1008 is moved to the end of the channel 1010, with or without the user breaking contact, and the second unlock image 1008 disappears. As shown in FIG. 11D, upon completion of the unlock action with respect to the second unlock image 1008, the device displays on the touch screen the user-interface objects 1106 associated with the application or event corresponding to the second unlock image 1008. In FIG. 11D, the event corresponding to the second unlock image is an incoming text message event and a prompt for the user to read it.

Figure 11E:
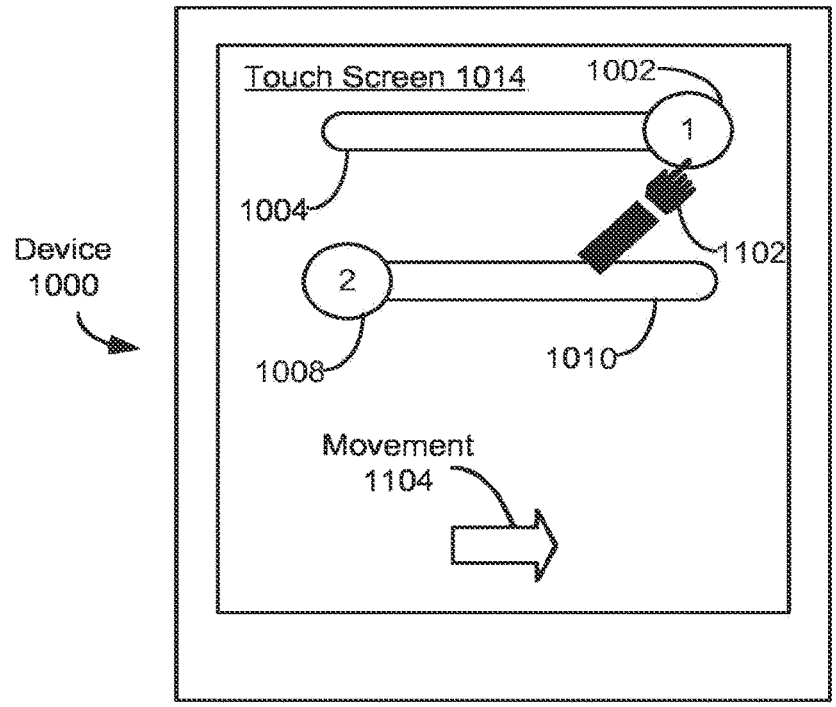
Figure 11F:
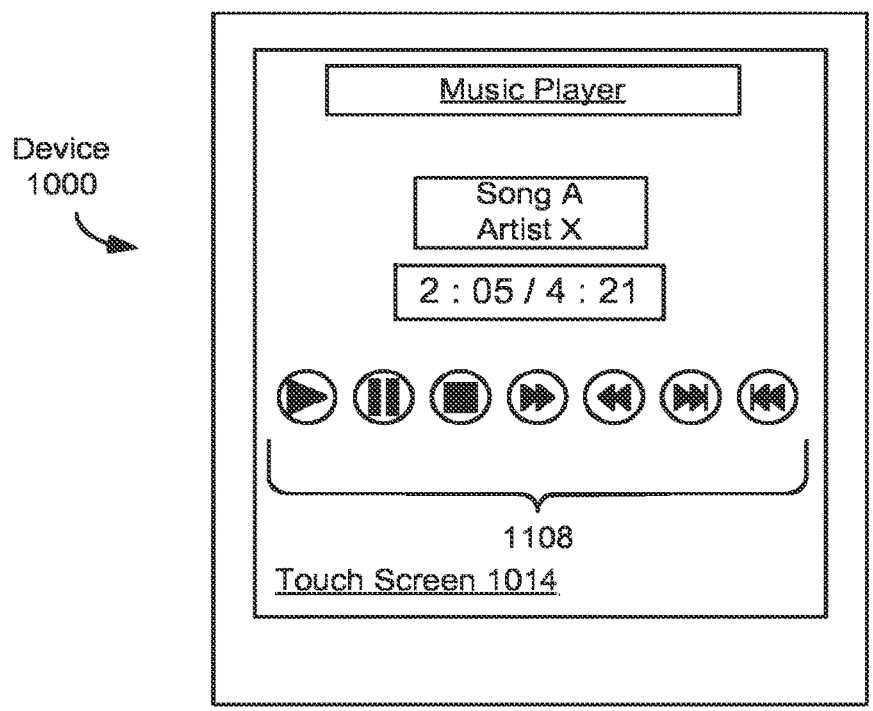

The user, instead of performing the unlock action with respect to the second unlock image 1108, may instead perform the unlock action gesture with respect to the first unlock image 1002. In FIG. 11E, the user does so and performs the unlock action with respect to the first unlock image 1002 by dragging the first unlock image, in the direction 1104, to the right end of the channel 1004. Upon completion of the unlock action, the device 1000 displays the user-interface objects 1108 associated with the application or event corresponding to the first unlock image 1002. In FIG. 11F, the application corresponding to the first unlock image is a music player application.

In some embodiments, the transition to a user interface active state, as described in FIGS. 9 and 11A-11E, may also include a concurrent transition in the optical intensity of user-interface objects, similar to that described above in relation to FIGS. 6, 7A-7D, and 8A-8C. Concurrent with the transition to a user interface active state, the user-interface objects associated with the application or event corresponding to the unlock image with which the user interacted to unlock the device increase in intensity. For example, the optical intensity of the user-interface objects 1106 associated with the text message prompt in FIG. 11D may be increased smoothly, as a function of the progress towards completion of the unlock action with respect to the second unlock image 1008. As another example, the optical intensity of the user-interface objects 1108 associated with music player application in FIG. 11F may be increased smoothly, as a function of the progress towards completion of the unlock action with respect to the first unlock image 1002.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch-sensitive display;
a physical input device;
one or more processors; and
memory storing one or more programs configured to be executed by the one or more processors, the one or more programs including instructions for:
detecting a user input via the physical input device; and
in response to the detected user input via the physical input device, displaying a visual cue on the touch-sensitive display of a predefined gesture performed on the touch-sensitive display required to unlock the electronic device to a user-interface active state.

2. The electronic device of claim 1, wherein displaying the visual cue on the touch-sensitive display includes displaying an unlock image while the electronic device is in a user-interface lock state, and wherein the predefined gesture is a gesture performed on the touch-sensitive display with respect, to the unlock image to unlock the electronic device to the user-interface active state.

3. The electronic device of claim 2, wherein the predefined gesture includes dragging the unlock image to a predefined location on the touch-sensitive display.

4. The electronic device of claim 2, wherein the predefined gesture includes moving the unlock image along a predefined path on the touch-sensitive display.

5. The electronic device of claim 2, the one or more programs further including instructions for:
detecting the predefined gesture performed on the touch-sensitive display with respect to the unlock image; and
in response to detecting the predefined gesture performed on the touch-sensitive display with respect to the unlock image, unlocking the electronic device to the user-interface active state.

6. The electronic device of claim 5, further comprising providing visual feedback of completion of the gesture required to unlock the electronic device to the user-interface active state.

7. The electronic device of claim 2, wherein the displayed unlock image is a first unlock image, wherein the predefined gesture is a first predefined gesture, and wherein the user-interface active state is a first user-interface active state; the one or more programs further including instructions for:
displaying a second unlock image on the touch-sensitive display while the electronic device is in the user-interface lock state, wherein a second predefined gesture performed on the touch-sensitive display with respect to the second unlock image will unlock the electronic device to a second user-interface active state that is different from the first user-interface active state.

8. The electronic device of claim 7, wherein the second unlock image is displayed in response to an event received by the electronic device, and wherein the second user-interface active state unlocks the electronic device only for an application associated with the received event.

9. The electronic device of claim 1, wherein the visual cue includes an animation related to the predefined gesture.

10. The electronic device of claim 1, wherein the visual cue indicates at least a portion of unlock criteria required for a gesture to unlock the device, the one or more programs further including instructions for:
after displaying the visual cue on the touch-sensitive display, detecting a gesture on the touch-sensitive display; and
in response to detecting the gesture:
in accordance with a determination that the gesture meets the unlock criteria, unlocking the electronic device; and
in accordance with a determination that the gesture does not meet the unlock criteria, maintaining the electronic device in a locked state.

11. The electronic device of claim 1, wherein the user-interface active state allows access only to a specific application.

12. The electronic device of claim 1, the one or more programs further including instructions for:
   detecting a gesture on the touch-sensitive display;
   determining that the gesture fails to meet criteria required to unlock the electronic device to the user-interface active state; and
   providing visual feedback of failure to complete the gesture required to unlock the electronic device to the user-interface active state.

13. The electronic device of claim 1, wherein the touch-sensitive display, is in a powered down state prior to displaying the visual cue.

14. A non-transitory computer-readable storage medium storing one or more programs configured to be executed by one or more processors of an electronic device with a touch-sensitive display and a physical input device, the one or more programs including instructions for:
   detecting a user input via the physical input device; and
   in response to the detected user input via the physical input device, displaying a visual cue on the touch-sensitive display of a predefined gesture performed on the touch-sensitive display required to unlock the electronic device to a user-interface active state.

15. The non-transitory computer-readable storage medium of claim 14, wherein displaying the visual cue on the touch-sensitive display includes displaying an unlock image while the electronic device is in a user-interface lock state, and wherein the predefined gesture is a gesture performed on the touch-sensitive display with respect to the unlock image to unlock the electronic device to the user-interface active state.

16. The non-transitory computer-readable storage medium of claim 15, wherein the predefined gesture includes dragging the unlock image to a predefined location on the touch-sensitive display.

17. The non-transitory computer-readable storage medium of claim 15, wherein the predefined gesture includes moving the unlock image along a predefined path on the touch-sensitive display.

18. The non-transitory computer-readable storage medium of claim 15, the one or more programs further including instructions for:
   detecting the predefined gesture performed on the touch-sensitive display with respect to the unlock image; and
   in response to detecting the predefined gesture performed on the touch-sensitive display with respect to the unlock image, unlocking the electronic device to the user-interface active state.

19. The non-transitory computer-readable storage medium of claim 18, further comprising providing visual feedback of completion of the gesture required to unlock the electronic device to the user-interface active state.

20. The non-transitory computer-readable storage medium of claim 15, wherein the displayed unlock image is a first unlock image, wherein the predefined gesture is a first predefined gesture, and wherein the user-interface active state is a first user-interface active state, the one or more programs further including instructions for:
   displaying a second unlock image on the touch-sensitive display while the electronic device is in the user-interface lock state, wherein a second predefined gesture performed on the touch-sensitive display with respect to the second unlock image will unlock the electronic device to a second user-interface active state that is different from the first user-interface active state.

21. The non-transitory computer-readable storage medium of claim 20, wherein the second unlock image is displayed in response to an event received by the electronic device, and wherein the second user-interface active state unlocks the electronic device only for an application associated with the received event.

22. The non-transitory computer-readable storage medium of claim 14, wherein the visual cue includes an animation related to the predefined gesture.

23. The non-transitory computer-readable storage medium of claim 14, wherein the visual cue indicates at least a portion of unlock criteria required for a gesture to unlock the device, the one or more programs further including instructions for:
   after displaying the visual cue on the touch-sensitive display, detecting a gesture on the touch-sensitive display; and
   in response to detecting the gesture:
      in accordance with a determination that the gesture meets the unlock criteria, unlocking the electronic device; and
      in accordance with a determination that the gesture does not meet the unlock criteria, maintaining the electronic device in a locked state.

24. The non-transitory computer-readable storage medium of claim 14, wherein the user-interface active state allows access only to a specific application.

25. The non-transitory computer-readable storage medium of claim 14, the one or more programs further including instructions for:
   detecting a gesture on the touch-sensitive display;
   determining that the gesture fails to meet criteria required to unlock the electronic device to the user-interface active state; and
   providing visual feedback of failure to complete the gesture required to unlock the electronic device to the user-interface active state.

26. The non-transitory computer-readable storage medium of claim 14, wherein the touch-sensitive display is in a powered down state prior to displaying the visual cue.

27. A method, comprising:
   at an electronic device with a touch-sensitive display and a physical input device:
      detecting a user input via the physical input device; and
      in response to the detected user input via the physical input device, displaying a visual cue on the touch-sensitive display of a predefined gesture performed on the touch-sensitive display required to unlock the electronic device to a user-interface active state.

28. The method of claim 27, wherein displaying the visual cue on the touch-sensitive display includes displaying an unlock image while the electronic device is in a user-interface lock state, and wherein the predefined gesture is a gesture performed on the touch-sensitive display with respect to the unlock image to unlock the electronic device to the user-interface active state.

29. The method of claim 28, wherein the predefined gesture includes dragging the unlock image to a predefined location on the touch-sensitive display.

30. The method of claim 28, wherein the predefined gesture includes moving the unlock image along a predefined path on the touch-sensitive display.

31. The method of claim 28, further comprising:
   detecting the predefined gesture performed on the touch-sensitive display with respect to the unlock image; and
   in response to detecting the predefined gesture performed on the touch-sensitive display with respect to the unlock image, unlocking the electronic device to the user-interface active state.

32. The method of claim 31, further comprising providing visual feedback of completion of the gesture required to unlock the electronic device to the user-interface active state.

33. The method of claim 28, wherein the displayed unlock image is a first unlock image, wherein the predefined gesture is a first predefined gesture, and wherein the user-interface active state is a first user-interface active state, further comprising:
  displaying a second unlock image on the touch-sensitive display while the electronic device is in the user-interface lock state, wherein a second predefined gesture performed on the touch-sensitive display with respect to the second unlock image will unlock the electronic device to a second user-interface active state that is different from the first user-interface active state.

34. The method of claim 33, wherein the second unlock image is displayed in response to an event received by the electronic device, and wherein the second user-interface active state unlocks the electronic device only for an application associated with the received event.

35. The method of claim 27, wherein the visual cue includes an animation related to the predefined gesture.

36. The method of claim 27, wherein the visual cue indicates at least a portion of unlock criteria required for a gesture to unlock the device, further comprising:
  after displaying the visual cue on the touch-sensitive display, detecting a gesture on the touch-sensitive display; and
  in response to detecting the gesture:
    in accordance with a determination that the gesture meets the unlock criteria, unlocking the electronic device; and
    in accordance with a determination that the gesture does not meet the unlock criteria, maintaining the electronic device in a locked state.

37. The method of claim 27, wherein the user-interface active state allows access only to a specific application.

38. The method of claim 27, further comprising:
  detecting a gesture on the touch-sensitive display;
  determining that the gesture fails to meet criteria required to unlock the electronic device to the user-interface active state; and
  providing visual feedback of failure to complete the gesture required to unlock the electronic device to the user-interface active state.

39. The method of claim 27, wherein the touch-sensitive display is in a powered down state prior to displaying the visual cue.

* * * * *

UNITED STATES PATENT AND TRADEMARK OFFICE
CERTIFICATE OF CORRECTION

| | |
|---|---|
| PATENT NO. | : 11,669,238 B2 |
| APPLICATION NO. | : 17/374825 |
| DATED | : June 6, 2023 |
| INVENTOR(S) | : Imran Chaudhri et al. |

It is certified that error appears in the above-identified patent and that said Letters Patent is hereby corrected as shown below:

In the Claims

Column 20, Line 12, Claim 2, delete "respect," and insert --respect--.

Column 20, Line 35, Claim 7, delete "state;" and insert --state,--.

Column 21, Line 11, Claim 13, delete "display," and insert --display--.

Signed and Sealed this
Seventeenth Day of September, 2024

*Katherine Kelly Vidal*

Katherine Kelly Vidal
*Director of the United States Patent and Trademark Office*